US012725244B2

(12) United States Patent
Zhao et al.

(10) Patent No.: US 12,725,244 B2
(45) Date of Patent: Sep. 1, 2026

(54) DISPLACEMENT DETECTION METHOD AND APPARATUS, DELIVERY APPARATUS, AND STORAGE MEDIUM

(71) Applicant: CONTEMPORARY AMPEREX TECHNOLOGY (HONG KONG) LIMITED, Hong Kong (CN)

(72) Inventors: Baiquan Zhao, Ningde (CN); Qi Chen, Ningde (CN); Dajun Ni, Ningde (CN); Qian Wu, Ningde (CN); Jianlei Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 132 days.

(21) Appl. No.: 18/646,798

(22) Filed: Apr. 26, 2024

(65) Prior Publication Data

US 2024/0296544 A1 Sep. 5, 2024

Related U.S. Application Data

(63) Continuation of application No. PCT/CN2022/085799, filed on Apr. 8, 2022.

(51) Int. Cl.
*G06T 7/00* (2017.01)
*G06T 7/13* (2017.01)
*G06T 7/73* (2017.01)

(52) U.S. Cl.
CPC .............. *G06T 7/0008* (2013.01); *G06T 7/13* (2017.01); *G06T 7/74* (2017.01); *G06T 2207/30108* (2013.01)

(58) Field of Classification Search
CPC ........... G06T 7/0008; G06T 7/13; G06T 7/74; G06T 2207/30108; G06T 7/11;
(Continued)

(56) References Cited

U.S. PATENT DOCUMENTS 6,534,952 B1 * 3/2003 Ishikawa ........... H01M 10/0409 320/107
2006/0046147 A1 3/2006 Nakai et al.
(Continued)

FOREIGN PATENT DOCUMENTS

CN 105290621 A 2/2016
CN 206278372 U 6/2017
(Continued)

OTHER PUBLICATIONS

The extended European search report received in the corresponding European Application 22936172.0, mailed on Jan. 10, 2025.
(Continued)

*Primary Examiner* — Xuemei G Chen
(74) *Attorney, Agent, or Firm* — K&L Gates LLP

(57) ABSTRACT

This application provides a displacement detection method for anode composite strip. The anode composite strip includes an anode plate and a separator attached to a surface of the anode plate, where the anode plate includes positioning holes. The displacement detection method includes: step S1000: obtaining an image of a portion of the anode composite strip including the positioning holes; and step S2000: calculating a displacement characteristic quantity based on the image, where the displacement characteristic quantity includes any one or any combination of a width direction displacement, a strip movement direction displacement, and a displacement angle.

14 Claims, 19 Drawing Sheets

(58) Field of Classification Search
CPC ......... G06T 7/0004; G06T 7/136; G06T 7/73; G06T 7/60; G06T 7/70; G06T 2207/30164; H01M 4/04; H01M 50/00; Y02E 60/10; G06V 10/25
See application file for complete search history.

(56) References Cited

U.S. PATENT DOCUMENTS

| | | | | |
|---|---|---|---|---|
| 2009/0202903 | A1 | 8/2009 | Chiang et al. | |
| 2012/0107669 | A1* | 5/2012 | Viavattine | H01M 50/179 429/153 |
| 2014/0272543 | A1 | 9/2014 | Devan et al. | |
| 2019/0319253 | A1* | 10/2019 | An | H01M 50/103 |
| 2021/0391122 | A1* | 12/2021 | Park | H01M 50/184 |
| 2023/0074096 | A1* | 3/2023 | Oh | H01M 50/557 |
| 2024/0183789 | A1* | 6/2024 | Choi | G01B 11/0608 |

FOREIGN PATENT DOCUMENTS

| | | | | |
|---|---|---|---|---|
| CN | 110738205 | A | 1/2020 | |
| CN | 111416142 | A | 7/2020 | |
| CN | 112577421 | A | 3/2021 | |
| CN | 213617108 | U | 7/2021 | |
| CN | 214589024 | U | 11/2021 | |
| JP | H06333708 | A | 12/1994 | |
| JP | 2007141590 | A | 6/2007 | |
| JP | 2009170136 | A | 7/2009 | |
| JP | 2010232145 | A | 10/2010 | |
| JP | 2012221713 | A | 11/2012 | |
| JP | 2016033868 | A | 3/2016 | |
| JP | 2018113198 | A | 7/2018 | |
| KR | 20200073381 | A * | 6/2020 | H01M 10/04 |
| KR | 20210078337 | A | 6/2021 | |
| WO | 2018/116542 | A1 | 6/2018 | |
| WO | 2019/163489 | A1 | 8/2019 | |

OTHER PUBLICATIONS

The partial supplementary European search report received in the corresponding European Application 22936172.0, mailed on Oct. 10, 2024.

Office Action (with English Machine Translation), mailed Apr. 1, 2025, for corresponding Japanese Patent Application Serial No. 2024-513160.

International Search Report received in the corresponding international application PCT/CN2022/085799, mailed Sep. 6, 2022.

Written Opinion of ISA received in the corresponding international application PCT/CN2022/085799, mailed Sep. 6, 2022.

Office Action (with English Machine Translation), mailed Aug. 19, 2025, for corresponding Japanese Patent Application Serial No. 2024-513160.

The Notice of Reasons for Refusal received in the counterpart JP Application 2024-513160, dated Apr. 1, 2025, 6 pages with English translation.

Office Action (with English Machine Translation), mailed Jun. 10, 2026, for corresponding Korean Patent Application Serial No. 10-2024-7009941.

Office Action (with English Machine Translation), mailed May 1, 2026, for corresponding Chinese Patent Application Serial No. 202280031809.3.

* cited by examiner

11

13-1

13-2

DISPLACEMENT DETECTION METHOD AND APPARATUS, DELIVERY APPARATUS, AND STORAGE MEDIUM

CROSS-REFERENCE TO RELATED APPLICATION

The present application is a continuation of International Application No. PCT/CN2022/085799, filed Apr. 8, 2022, entitled "DISPLACEMENT DETECTION METHOD AND APPARATUS, DELIVERY APPARATUS, AND STORAGE MEDIUM", which is incorporated herein by reference in its entirety.

TECHNICAL FIELD

This application relates to the field of battery technologies, and in particular, to a displacement detection method and apparatus and delivery apparatus for anode composite strip and a storage medium.

BACKGROUND

Cell production is an important part of the battery production process. In the cell production process, an anode plate, a separator, and a cathode strip need to be aligned with each other. Electrode plate alignment is a crucial indicator to measure the quality of cells, and low electrode plate alignment greatly reduces the yield of batteries and increase production costs of the batteries. In some cases, electrode plate displacement is usually inspected manually to guarantee alignment between the anode plate and the cathode strip, which can greatly increase labor costs. In addition, it is often difficult to find small deviations by manual inspection, which cannot meet the requirement of high precision.

SUMMARY

This application is intended to resolve at least one of the technical problems in the prior art. In view of this, an objective of this application is to provide a displacement detection method, so as to solve the problem of low precision of manual detection.

According to a first aspect, an embodiment of this application provides a displacement detection method for anode composite strip, where the anode composite strip includes an anode plate and a separator attached to a surface of the anode plate, the anode plate including positioning holes. The displacement detection method includes: step S1000: obtaining an image of a portion of the anode composite strip including the positioning holes; and step S2000: calculating a displacement characteristic quantity based on the image, where the displacement characteristic quantity indicates a displacement distance and/or angle of the anode composite strip in a specified direction.

After the anode plate is laminated with the separator, the displacement detection method can still effectively detect the positioning holes, improving accuracy and precision of displacement detection. In addition, with high detection efficiency, the displacement distance and/or angle of the anode composite strip in any direction can also be detected while calculating the displacement characteristic quantity based on the image, thereby improving the detection speed, reducing the malfunction rate, and lowering the detection costs.

In some embodiments, the displacement characteristic quantity includes any one or any combination of a width direction displacement, a strip movement direction displacement, and a displacement angle. The displacement of the anode composite strip can be quickly positioned based on one or more of these three displacement characteristic quantities: the width direction displacement, the strip movement direction displacement, and the displacement angle, facilitating displacement correction on this basis. In some embodiments, the displacement characteristic quantity includes a width direction displacement, and step S2000 includes step S2100 of calculating the width direction displacement, step S2100 including: step S2110: positioning, based on the image, an edge of an anode plate coating region parallel to a strip movement direction; step S2120: calculating a center point of the image and a width direction midline parallel to a width direction; step S2130: calculating an intersection point between the width direction midline of the image and the edge of the anode plate coating region parallel to the strip movement direction; and step S2140: calculating a distance between the center point and the intersection point as the width direction displacement.

The detection method can quickly and efficiently detect the width direction displacement of the anode composite strip, which features high detection efficiency, accuracy, and precision, and can increase the response speed of a control system and reduce the malfunction rate.

In some embodiments, step S2110 includes: step S2111: extracting the anode plate coating region through a threshold processing algorithm based on grayscale differences between the anode plate coating region and other regions of the anode composite strip; step S2112: fitting a bounding rectangle of the extracted anode plate coating region; and step S2113: determining, based on the bounding rectangle, the edge of the anode plate coating region parallel to the strip movement direction.

The detection method can quickly position the edge of the anode plate coating region parallel to the strip movement direction, facilitating the calculation of the width direction displacement, thereby improving the detection efficiency and shortening the detection time.

In some embodiments, step S2113 includes: step S2113*a*: taking an outer side edge of the bounding rectangle parallel to the strip movement direction as an initial positioning edge; step S2113*b*: displacing an edge detection ROI box to the initial positioning edge; step S2113*c*: obtaining edge points through an edge detection algorithm; and step S2113*d*: fitting the obtained edge points into a straight line and determining the straight line as the edge of the anode plate coating region parallel to the strip movement direction.

The foregoing detection method can accurately and quickly extract from the image the edge of the electrode plate coating region parallel to the strip movement direction, featuring edge detection quickness and high fitting precision.

In some embodiments, step S2113*b* includes: step S2113*b*1: calculating coordinates of a center point of the initial positioning edge; and step S2113*b*2: displacing the edge detection ROI box to the initial positioning edge based on the coordinates of the center point.

The foregoing detection method can allow the edge detection ROI box to be quickly positioned to the initial positioning edge, shortening the edge detection time, reducing the control risk, and further improving the detection efficiency and precision.

In some embodiments, the displacement characteristic quantity includes a strip movement direction displacement, and step S2000 includes step S2200 of calculating the strip movement direction displacement, step S2200 including:

step S2210: positioning, based on the image, a side edge corresponding to the positioning holes parallel to a width direction; step S2220: calculating a center point of the image and a strip movement direction midline parallel to a strip movement direction; step S2230: calculating an intersection point between the strip movement direction midline of the image and the side edge corresponding to the positioning holes parallel to the width direction; and step S2240: calculating a distance between the center point and the intersection point as the strip movement direction displacement.

The foregoing detection method can detect both the width direction displacement and strip movement direction displacement of the anode composite strip on one image, which feature high detection efficiency, accuracy, and precision, and can increase the detection speed and reduce the malfunction rate.

In some embodiments, step S2210 includes: step S2211: detecting a region of the positioning holes based on grayscale differences between the positioning holes and the anode plate coating region; and step S2212: obtaining, through an edge detection algorithm, the side edge corresponding to the positioning holes parallel to the width direction.

The foregoing detection method can quickly position the side edge corresponding to the positioning holes parallel to the width direction, facilitating the calculation of the strip movement direction displacement, thereby improving the detection efficiency and shortening the detection time.

In some embodiments, step S2212 includes: step S2212*a*: displacing an edge detection ROI box to the region of the positioning holes; step S2212*b*: obtaining, through the edge detection algorithm, edge points of the side edge corresponding to the positioning holes parallel to the width direction; and step S2212*c*: fitting the obtained edge points into a straight line and determining the straight line as the side edge corresponding to the positioning holes parallel to the width direction.

The foregoing detection method can accurately extract from the image the side edge corresponding to the positioning holes parallel to the width direction, featuring quick edge detection and high fitting precision.

In some embodiments, step S2212*a* includes: step S2212*a*1: calculating coordinates of a center point of the detected region corresponding to the positioning holes; and step S2212*a*2: displacing the edge detection ROI box to the region of the positioning holes based on the coordinates of the center point.

The foregoing detection method can allow the ROI box to be quickly positioned to the positioning holes, shortening the edge detection time, further improving the detection efficiency and precision.

In some embodiments, the anode plate includes first positioning holes and second positioning holes, the first positioning holes and the second positioning holes being spaced apart in a width direction and respectively having a first side edge and second side edge parallel to the width direction, with the first side edge and the second side edge arranged collinearly. Step S1000 includes obtaining a first image of a portion of the anode composite strip including the first positioning holes and a second image of a portion of the anode composite strip including the second positioning holes, where the displacement characteristic quantity includes a displacement angle. Step S2000 includes step S2300 of calculating the displacement angle, step S2300 including: step S2310: positioning the first side edge corresponding to the first positioning holes based on the first image and positioning the second side edge corresponding to the second positioning holes based on the second image; step S2320: fitting the first side edge and the second side edge to obtain a connection line between the first side edge and the second side edge; and step S2330: calculating an angle between the connection line and a reference line as the displacement angle, where the reference line is a contour line parallel to the first image or the second image and parallel to a strip movement direction.

The foregoing detection method can quickly and efficiently detect slight angle displacement of the anode composite strip at low costs, which features high detection efficiency, accuracy, and precision, and can increase the response speed of the control system and reduce the malfunction rate. The first image of the portion of the anode composite strip including the first positioning holes and the second image of the portion of the anode composite strip including the second positioning holes are jointly used for calculating the displacement angle. Compared with single-image detection, the detection method can broaden the detection range, is applicable to anode composite strips with a larger width, can position the position of the positioning holes more accurately, and has higher detection precision.

In some embodiments, step S2310 includes: step S2311: detecting a region of the first positioning hole and a region of the second positioning hole based on grayscale differences between the first positioning holes and the second positioning holes and an anode plate coating region; and step S2312: obtaining, through an edge detection algorithm, the first side edge corresponding to the first positioning holes and the second side edge corresponding to the second positioning holes.

The foregoing detection method can quickly position the first side edge corresponding to the first positioning holes and the second side edge corresponding to the second positioning holes, facilitating the calculation of the displacement angle, thereby improving the detection efficiency, accuracy, and precision.

In some embodiments, step S2312 includes: step S2312*a*: displacing an edge detection ROI box to the region of the first positioning hole and the region of the second positioning hole; step S2312*b*: obtaining, through the edge detection algorithm, first edge points of the first side edge corresponding to the first positioning holes and second edge points of the second side edge corresponding to the second positioning holes; and step S2312*c*: fitting the obtained first edge points into a first straight line and determining the first straight line as the first side edge corresponding to the first positioning holes, and fitting the obtained second edge points into a second straight line and determining the second straight line as the second side edge corresponding to the second positioning holes.

The foregoing detection method can accurately extract the first side edge corresponding to the first positioning holes and the second side edge corresponding to the second positioning holes from the first image and the second image respectively, featuring quick edge detection and high fitting precision, thereby increasing the detection speed.

In some embodiments, step S2312*a* includes: step S2312*a*1: calculating coordinates of a first center point of the detected region of the first positioning hole and coordinates of a second center point of the detected region of the second positioning hole; and step S2312*a*2: displacing the edge detection ROI box to the region of the first positioning hole and the region of the second positioning hole separately based on the coordinates of the first center point and the coordinates of the second center point.

The foregoing detection method can allow the ROI box to be quickly positioned to the first positioning holes and the second positioning holes, shortening the edge detection time, further improving the detection efficiency and precision, and increasing the detection speed.

According to a second aspect, an embodiment of this application provides a displacement detection apparatus for anode composite strip, where the anode composite strip includes an anode plate and a separator attached to a surface of the anode plate, the anode plate including positioning holes; and the displacement detection apparatus includes: an image obtaining device, the image obtaining device being configured to obtain an image of a portion of the anode composite strip including the positioning holes; and a controller, the controller being configured to receive the image obtained by the image obtaining device; a memory; and a processor, the processor being configured to execute instructions stored in the memory to perform the method in the foregoing embodiments.

After the anode plate is laminated with the separator, the displacement detection apparatus can still effectively detect the positioning holes, improving accuracy and precision of positioning holes identification and displacement detection. In addition, a displacement characteristic quantity is calculated based on the image obtained by the image obtaining device, providing high detection efficiency, and any one or any combination of a width direction displacement, a strip movement direction displacement, and a displacement angle can also be detected, reducing the detection costs.

In some embodiments, the image obtaining device includes: a camera, the camera being disposed on a first side of the anode composite strip; and a light source, the light source being provided on a second side of the anode composite strip opposite the first side.

The camera has a wide field of view, can obtain images around the positioning holes in a large area, can still detect the displacement characteristic quantity although some of the positioning holes are blocked, and features high detection accuracy and precision.

In some embodiments, the light source is a red light source.

With strong light wave penetration, the red light source is especially applicable to the anode composite strip laminated with the separator, which can improve the resolution of the positioning holes in the image and accurately position the positioning holes, thereby improving the detection accuracy of the displacement characteristic quantity.

According to a third aspect, an embodiment of this application provides a delivery apparatus for anode composite strip, where the anode composite strip includes an anode plate and a separator attached to a surface of the anode plate, the anode plate including positioning holes; and the delivery apparatus includes: the displacement detection apparatus in the foregoing embodiments; and a control device in communication connection with the displacement detection apparatus, the control device being configured to control an operation of the delivery apparatus based on a displacement characteristic quantity output by the displacement detection apparatus.

The foregoing delivery apparatus for anode composite strip can quickly and accurately detect the displacement characteristic quantity in transfer of the anode composite strip. The control device can make a timely response to displacement of the anode composite strip to reduce the malfunction rate.

According to a fourth aspect, an embodiment of this application provides a computer-readable storage medium, where executable instructions are stored in the computer-readable storage medium, and when the instructions are executed by a processor, the processor performs the method in the foregoing embodiment.

The foregoing description is merely an overview of the technical solution of this application. For a better understanding of the technical means in this application such that they can be implemented according to the content of the specification, and to make the above and other objectives, features, and advantages of this application more obvious and easier to understand, the following describes specific embodiments of this application.

BRIEF DESCRIPTION OF DRAWINGS

In the accompanying drawings, unless otherwise specified, the same reference signs throughout a plurality of accompanying drawings indicate the same or similar components or elements. These accompanying drawings are not necessarily be drawn to scale. It should be noted that these accompanying drawings are merely intended to illustrate some embodiments disclosed in this application and should not be construed as any limitations on the scope of this application.

Figure 1:
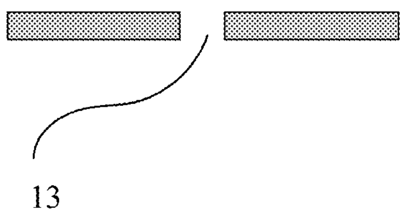
FIG. 1 is a schematic diagram of an anode composite strip according to some embodiments of this application.

DESCRIPTION OF REFERENCE SIGNS anode composite strip 1; anode plate 11; separator 12; separator edge 121; positioning holes 13; first positioning holes 13-1; second positioning holes 13-2; anode plate coating region 14; cathode strip 2; cathode insertion position 3;

width direction displacement D1; strip movement direction displacement D2; displacement angle D3;

image 4; image edge 41; center point O of image; edge $L_a$ of anode plate coating region parallel to strip movement direction; width direction midline $L_b$ of image; bounding rectangle R; side edge $L_c$ of positioning holes parallel to width direction; strip movement direction midline $L_d$ of image parallel to strip movement direction; connection line $L_e$ of first side edge and second side edge; contour line $L_f$ parallel to first image or second image and parallel to strip movement direction; first side edge $L_c$-1 of first positioning holes parallel to width direction; second side edge $L_c$-2 of second positioning holes in width direction;

image obtaining device 5; camera 51; light source 52; and prism 53.

DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by persons skilled in the art to which this application relates. The terms used herein are intended to merely describe the specific embodiments rather than to limit this application. The terms “include”, “comprise”, and “have” and any other variations thereof in the specification, claims and brief description of drawings of this application are intended to cover non-exclusive inclusions.

In the description of the embodiments of this application, the technical terms “first”, “second” and the like are merely intended to distinguish between different objects, and shall not be understood as any indication or implication of relative importance or any implicit indication of the number, particular sequence or primary-secondary relationship of the technical features indicated. In the description of the embodiments of this application, “a plurality of” means at least two unless otherwise specifically stated.

In this specification, reference to “embodiment” means that specific features, structures or characteristics described with reference to the embodiment may be incorporated in at least one embodiment of this application. The word “embodiment” appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term “and/or” is only an associative relationship for describing associated objects, indicating that three relationships may be present. For example, A and/or B may indicate the following three cases: presence of only A, presence of both A and B, and presence of only B. In addition, the character “/” in this specification generally indicates an “or” relationship between contextually associated objects.

In the description of the embodiments of this application, the term “a plurality of” means more than two (inclusive). Similarly, “a plurality of groups” means more than two (inclusive) groups, and “a plurality of pieces” means more than two (inclusive) pieces.

In the description of the embodiments of this application, the orientations or positional relationships indicated by the technical terms “center”, “longitudinal” “transverse”, “length”, “width”, “thickness”, “upper”, “lower”, “front”, “rear”, “left”, “right”, “vertical”, “horizontal”, “top”, “bottom”, “inside”, “outside”, “clockwise”, “counterclockwise”, “axial”, “radial”, “circumferential”, and the like are based on the orientations or positional relationships as shown in the accompanying drawings. These terms are merely for ease and brevity of the description of the embodiments of this application rather than indicating or implying that the means or components mentioned must have specific orientations, or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, and may refer to a direct connection, an indirect connection via an intermediate medium, an internal communication between two elements, or an interaction between two elements. Persons of ordinary skill in the art can understand specific meanings of these terms in the embodiments of this application as appropriate to specific situations.

In a forming process, compared with cells formed by winding, cells formed by stacking have the advantages of high rate and high energy density. In addition, compared with a conventional stacking machine, a continuous anode stacking machine can form an anode strip of an entire cell just by cutting a tail piece, which can reduce the safety hazards caused by edge trimming of stacked cells.

Figure 2:
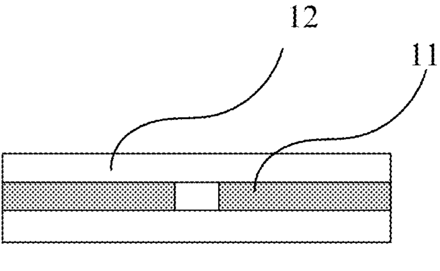
FIG. 2 is a schematic diagram of an anode plate according to some embodiments of this application.
Figure 3:
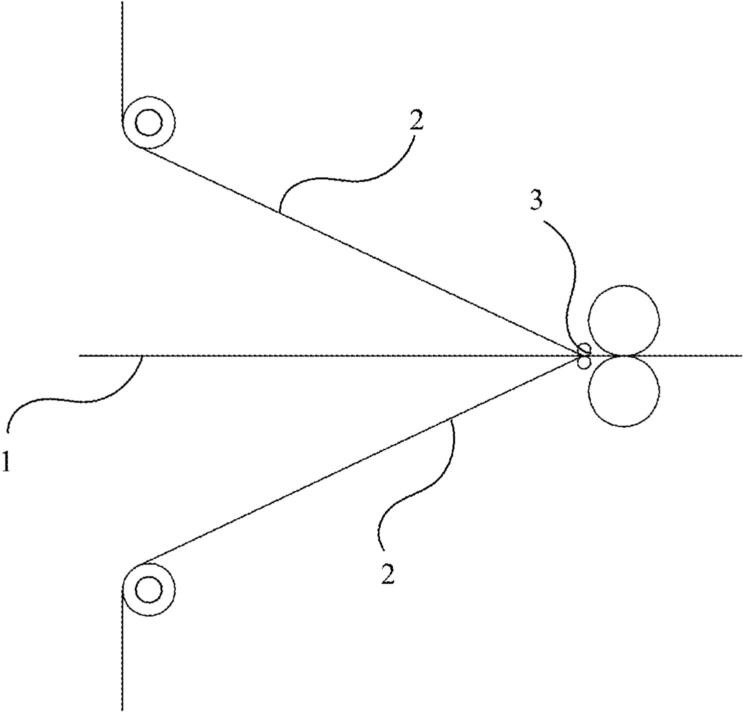
FIG. 3 is a schematic diagram of a cathode insertion according to some embodiments of this application.
Figure 4:
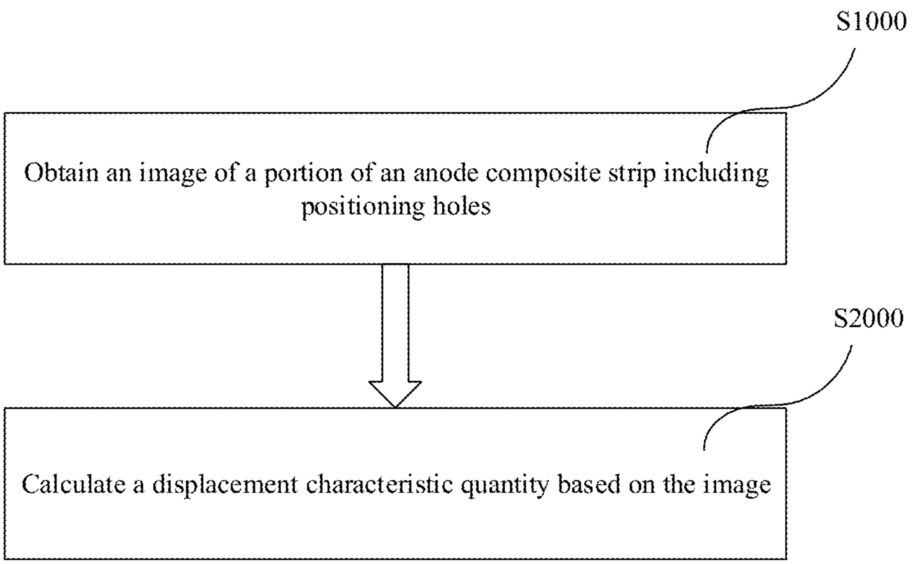
FIG. 4 is a flowchart of a displacement detection method for anode composite strip according to some embodiments of this application.

Referring to FIG. 1 to FIG. 3, on the continuous anode stacking machine, a separator 12 is attached to a surface of an anode plate 11 to form an anode composite strip 1. The anode composite strip 1 needs to be transferred in a predetermined direction so as to achieve accurate insertion of a cathode strip 2 at a cathode insertion position 3, guaranteeing the formation quality of the entire stacked cell. To improve the accuracy of the insertion position of the cathode strip 2, positioning holes 13 are usually provided on the anode plate 11, and positions of the positioning holes 13 are detected so as to detect whether the anode composite strip 1 has displaced in the transferring process. However, the anode plate 11 has been laminated with the separator 12 in this process, so stains on the separator 12, burrs generated during die cutting of the positioning holes 13, and deformation of the positioning holes 13 after rolling of the anode plate 11 can all result in abnormal sensing of a sensor, which makes it difficult for a conventional sensor detection method to accurately detect the position of the positioning holes 13, resulting in a high risk of missed detection and false detection.

Based on the foregoing technical problems found, the inventors, through in-depth research, provide a displacement detection method for anode composite strip 1. Referring to FIG. 1 to FIG. 4, the anode composite strip 1 includes an anode plate 11 and a separator 12 attached to a surface of the anode plate 11, the anode plate 11 including positioning holes 13. The displacement detection method for anode composite strip 1 includes: step S1000: obtaining an image 4 of a portion of the anode composite strip 1 including the positioning holes 13; and step S2000: calculating a displacement characteristic quantity based on the image 4, where the displacement characteristic quantity indicates a displacement distance and/or angle of the anode composite strip 1 in a specified direction.

The anode plate 11 is an electrode plate carrying an anode active material, and a region coated with the anode active material forms an anode plate coating region 14. The positioning hole 13 refers to a characteristic portion of the anode plate 11 that can position and identify. It can be understood that the positioning hole 13 may be circular, rectangular, square, or of any other shapes. In some embodiments, the positioning hole 13 is a narrow rectangle, and long sides of the positioning hole are perpendicular to a strip movement direction of the anode composite strip 1 to so as to implement better identification. In some embodiments, the positioning holes 13 are located at the anode plate coating region 14. In some embodiments, the positioning holes 13 are located close to coating edges at the anode plate coating region 14, facilitating obtaining and positioning of the image 4. In some embodiments, the positioning holes 13 are equidistantly provided on the anode plate 11 in a direction parallel to the strip movement direction, facilitating continuous detection of the positioning holes 13, thereby implementing online real-time monitoring of displacement detection. The separator 12 refers to a film for separating the anode plate 11 and the cathode strip 2 of the cell, preventing short circuit between a cathode and an anode in a battery. The displacement characteristic quantity may be a vector for indicating the displacement distance and/or angle of the anode composite strip 1 in the specified direction. The displacement characteristic quantity may be displacement of any characteristic portion of the anode composite strip 1 relative to a reference portion in the image 4. The characteristic portion may be an easily identifiable portion of the anode composite strip 1, for example, the positioning holes 13 and the edge of the anode plate coating region 14. The reference portion may be any position in the image, for example, a midpoint and a contour line of the image 4. In some embodiments, in response to a difference greater than a threshold between the displacement characteristic quantity and a predetermined quantity, alarm information is sent for alerting, serving as a timely reminder. The predetermined quantity refers to displacement of the characteristic portion relative to the reference portion at a position where the characteristic portion should arrive according to predetermined transfer setting. In some embodiments, in response to the difference greater than the threshold between the displacement characteristic quantity and the predetermined quantity, a control system performs displacement correction based on the difference between the displacement characteristic quantity and the predetermined quantity to achieve closed-loop control so as to achieve automatic detection and displacement correction.

After the anode plate 11 is laminated with the separator 12, the displacement detection method can still effectively detect the positioning holes 13, improving accuracy and precision of displacement detection. In addition, with high detection efficiency, the displacement distance and/or angle of the anode composite strip 1 in the specified direction can also be detected while calculating the displacement characteristic quantity based on the image 4, thereby increasing the detection speed, reducing the malfunction rate, and lowering the detection costs.

According to some embodiments of this application, the displacement characteristic quantity includes any one or any combination of a width direction displacement D1, a strip movement direction displacement D2, and a displacement angle D3.

The width direction displacement D1 refers to a quantity of the displacement characteristic quantity in a width direction, and the width direction is a direction perpendicular to a strip movement direction of the anode composite strip 1. The strip movement direction displacement D2 refers to a quantity of the displacement characteristic quantity in a strip movement direction, and the strip movement direction is a transferring direction of the anode composite strip 1. The displacement angle D3 may be angle displacement of any characteristic portion or a connection line between any characteristic portion of the anode composite strip 1 relative to the reference portion in the image 4.

The displacement of the anode composite strip 1 can be quickly positioned based on one or more of these three displacement characteristic quantities: the width direction displacement D1, the strip movement direction displacement D2, and the displacement angle D3, facilitating displacement correction on this basis.

Figure 5:
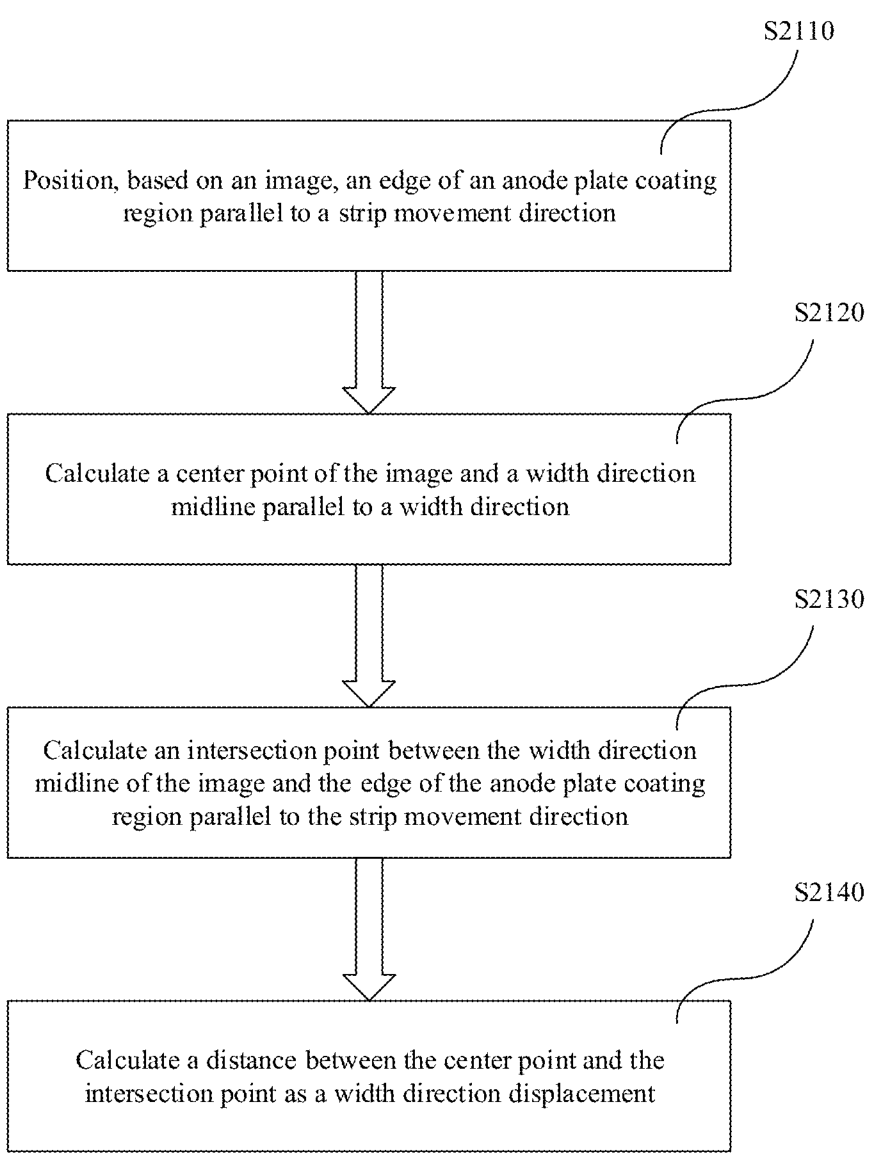
FIG. 5 is a flowchart of calculating a width direction displacement based on an image according to some embodiments of this application.
Figure 6:
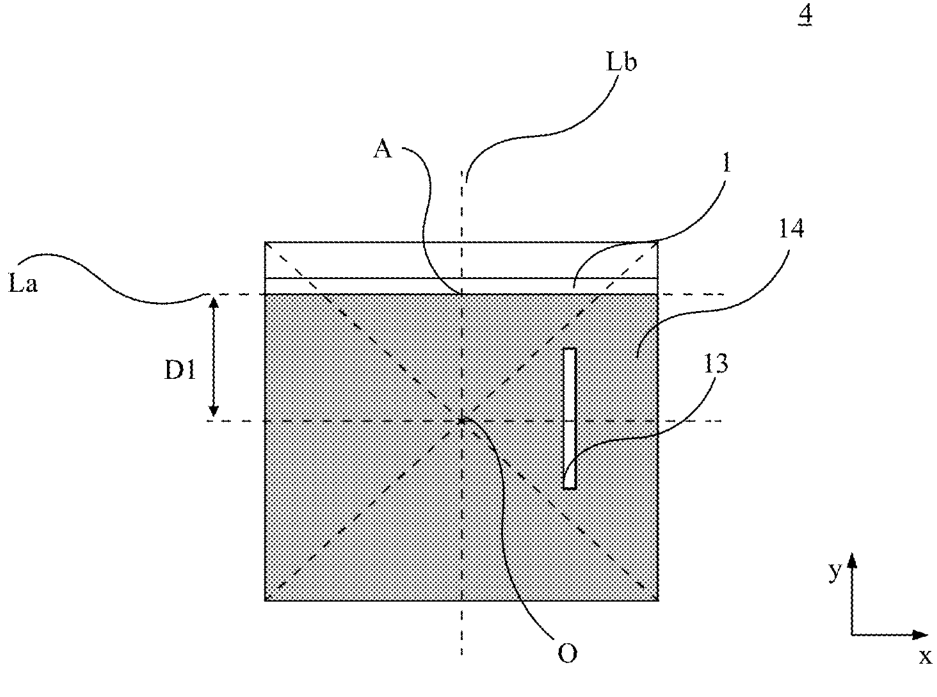
FIG. 6 is a schematic diagram of calculating a width direction displacement based on an image according to some embodiments of this application.

According to some embodiments of this application, referring to FIG. 5 and FIG. 6, the displacement characteristic quantity includes a width direction displacement D1, and step S2000 includes step S2100 of calculating the width direction displacement D1, step S2100 including: step S2110: positioning, based on the image 4, an edge $L_a$ of an anode plate coating region 14 parallel to a strip movement direction; step S2120: calculating a center point O of the image 4 and a width direction midline $L_b$ parallel to a width direction; step S2130: calculating an intersection point A between the width direction midline $L_b$ of the image 4 and the edge $L_a$ of the anode plate coating region 14 parallel to the strip movement direction; and step S2140: calculating a distance between the center point O and the intersection point A as the width direction displacement D1.

Still referring to FIG. 6, in some embodiments, a direction x in FIG. 6 is defined as the strip movement direction, a direction y perpendicular to the direction x is defined as the width direction, and the obtained image 4 includes the edge $L_a$ of the anode plate coating region 14 parallel to the direction x as the strip movement direction. In some embodiments, the obtained image 4 further includes an edge of the anode composite strip 1 parallel to the direction x as the strip movement direction. The center point O of the image 4 is an intersection point between diagonal lines of the image 4. The width direction midline $L_b$ parallel to the width direction y is a midline of the image 4 that passes through the center point O of the image 4 and is parallel to the width direction y. In some embodiments, in response to an absolute value of a difference between the width direction displacement D1 and a predetermined width direction displacement being greater than a threshold, alarm information is sent for alerting. In some embodiments, in response to the difference between the width direction displacement D1 and the predetermined width direction displacement being greater than the threshold, the control system performs displacement correction in the width direction based on the difference between the width direction displacement D1 and the predetermined width direction displacement, so as to achieve automatic detection and displacement correction.

The foregoing detection method can quickly and efficiently detect the width direction displacement D1 of the anode composite strip 1, which features high detection efficiency, accuracy, and precision, and can increase the response speed of the control system and reduce the malfunction rate.

Figure 7:
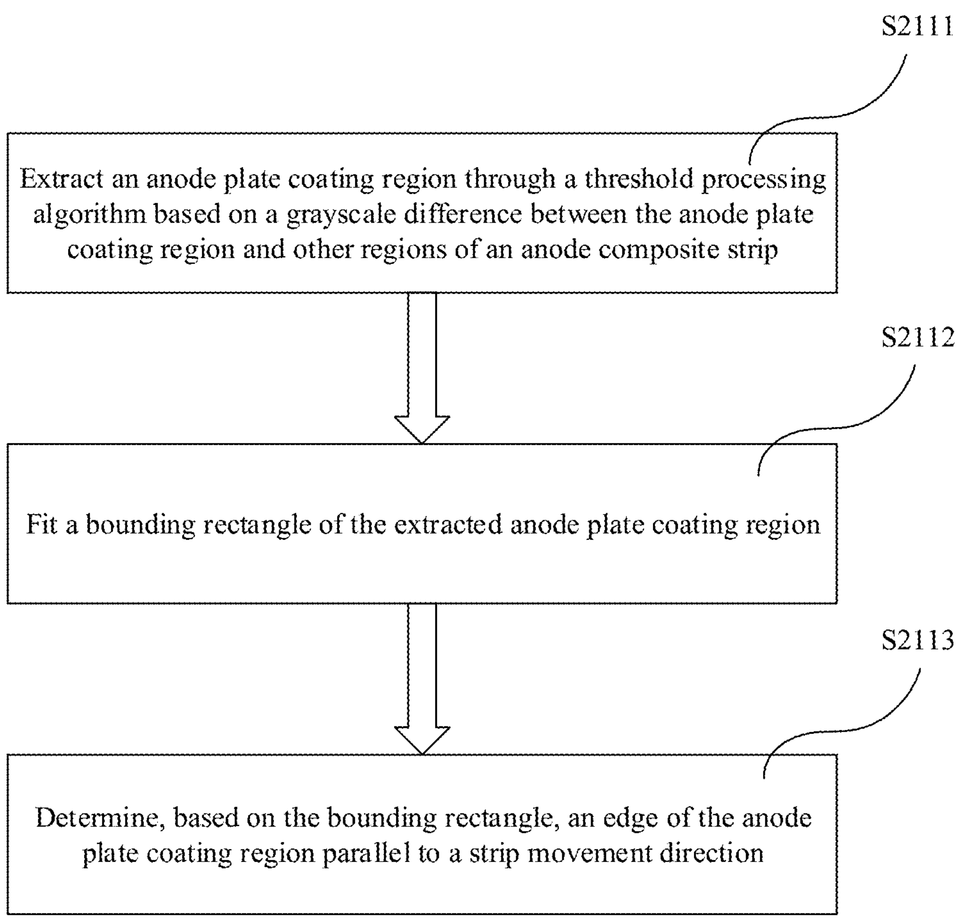
FIG. 7 is a flowchart of positioning, based on an image, an edge of an anode plate coating region parallel to a strip movement direction according to some embodiments of this application.
Figure 8:
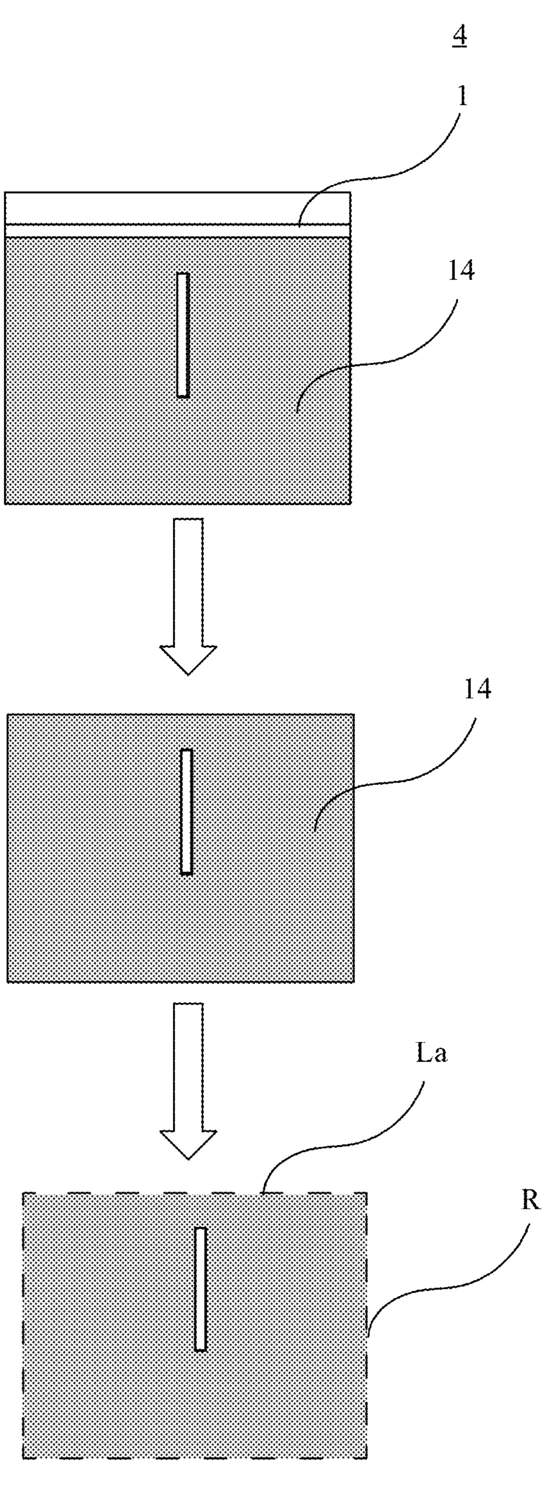
FIG. 8 is a schematic diagram of positioning, based on an image, an edge of an anode plate coating region parallel to a strip movement direction according to some embodiments of this application.

According to some embodiments of this application, referring to FIG. 7 and FIG. 8, step S2110 includes: step S2111: extracting the anode plate coating region 14 through a threshold processing algorithm based on grayscale differences between the anode plate coating region 14 and other regions of the anode composite strip 1; step S2112: fitting a bounding rectangle R of the extracted anode plate coating region 14; and step S2113: determining, based on the bounding rectangle R, the edge $L_a$ of the anode plate coating region 14 parallel to the strip movement direction.

As coated with the anode active material, the anode plate coating region 14 shows a grayscale different from that of the transparent separator 12 in the image 4. Therefore, the anode plate coating region 14 can be quickly extracted based on the grayscale differences between the anode plate coating region 14 and other regions of the anode composite strip 1. The threshold processing algorithm refers to a threshold operator based on a HALCON platform, a region with a grayscale value within a predetermined value range is extracted as the anode plate coating region 14. In some embodiments, a range of 0-20 is selected as the predetermined value range of the extracted grayscale value. In some embodiments, step S2111 includes: step S2111*a*: determining whether the grayscale difference between regions of the image 4 is greater than a threshold; step S2111*b*: in response to the grayscale difference between the regions of the image 4 being greater than the threshold, extracting the region with the grayscale value within the predetermined value range; and step S2111*c*: in response to the grayscale difference between the regions of the image 4 being less than the threshold or absence of the region with the grayscale value within the predetermined value range, sending alarm information to the control system to indicate that the anode plate coating region 14 is not found.

The foregoing detection method can quickly position the edge $L_a$ of the anode plate coating region 14 parallel to the strip movement direction, facilitating the calculation of the width direction displacement D1, thereby improving the detection efficiency and shortening the detection time.

Figure 9:
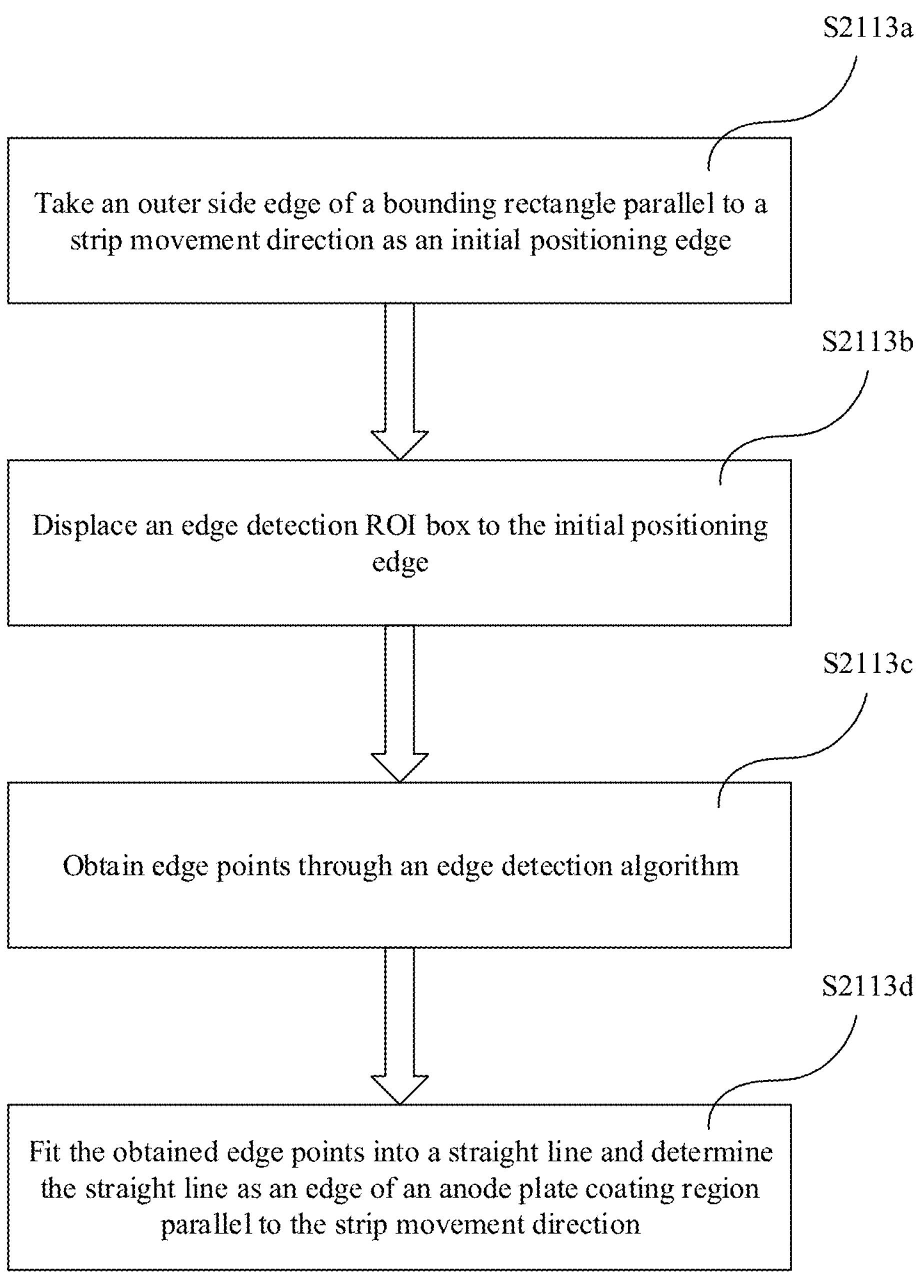
FIG. 9 is a flowchart of determining, based on a bounding rectangle, an edge of an anode plate coating region parallel to a strip movement direction according to some embodiments of this application.
Figure 10:
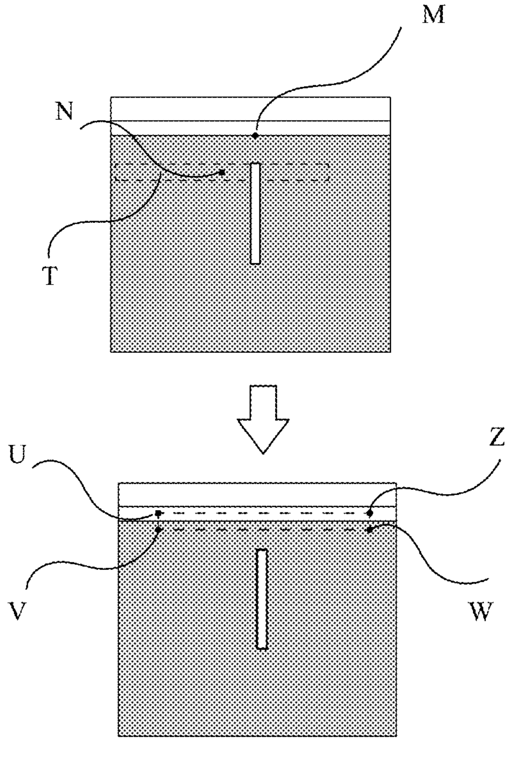
FIG. 10 is a schematic diagram of determining, based on a bounding rectangle, an edge of an anode plate coating region parallel to a strip movement direction according to some embodiments of this application.

According to some embodiments of this application, referring to FIG. 9 and FIG. 10, step S2113 includes: step S2113*a*: taking an outer side edge of the bounding rectangle R parallel to the strip movement direction as an initial positioning edge; step S2113*b*: displacing an edge detection ROI box T to the initial positioning edge; step S2113*c*: obtaining edge points through an edge detection algorithm; and step S2113*d*: fitting the obtained edge points into a straight line and determining the straight line as the edge $L_a$ of the anode plate coating region 14 parallel to the strip movement direction.

In some embodiments, a determining step present between step S2113*c* and step S2113*d* includes: when the number of the edge points obtained through the edge detection algorithm exceeds a threshold of the number of edge points, fitting the obtained edge points into a straight line; and when the number of the edge points obtained through the edge detection algorithm is smaller than the threshold of the number of edge points, sending alarm information to indicate failure in edge detection. In some embodiments, the threshold is set to 30. In some embodiments, abnormal edge points are removed by filtering, and the obtained edge points are fitted into a straight line using the least square method.

The foregoing detection method can accurately and quickly extract from the image 4 the edge $L_a$ of the electrode plate coating region 14 parallel to the strip movement direction, featuring quick edge detection and high fitting precision.

Figure 11:
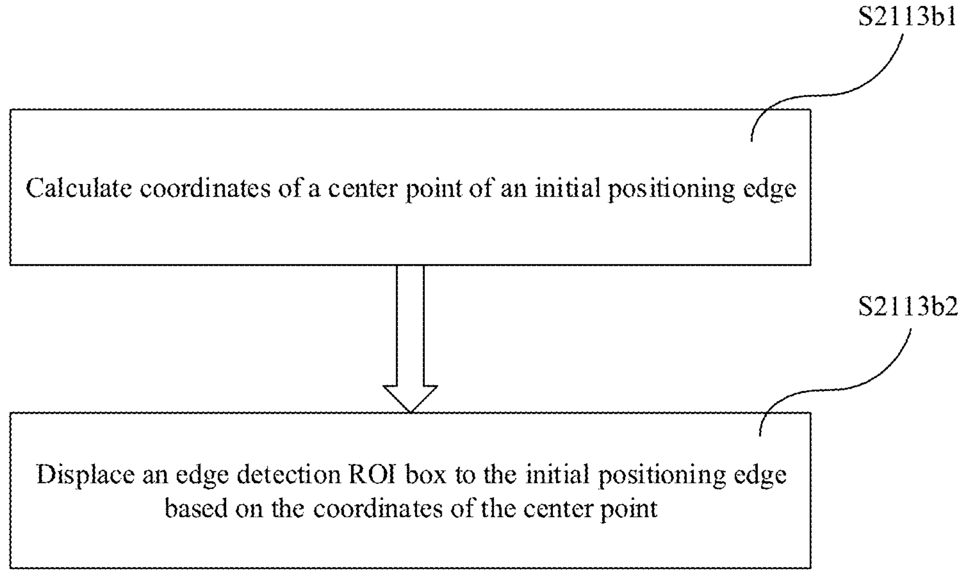
FIG. 11 is a flowchart of displacing of an edge detection ROI box to an initial positioning edge according to some embodiments of this application.

According to some embodiments of this application, referring to FIG. 10 and FIG. 11, step S2113*b* includes: step S2113*b*1: calculating coordinates of a center point M of the initial positioning edge; and step S2113*b*2: displacing the edge detection ROI box T to the initial positioning edge based on the coordinates of the center point M.

In some embodiments, still referring to FIG. 10, step S2113*b*2 includes displacing a center point N of the edge detection ROI box T to the center point M of the initial positioning edge, where the center point N of the edge detection ROI box T is an intersection point between connection lines of diagonal lines of the edge detection ROI box T. In some embodiments, the coordinates of the center point M of the initial positioning edge is defined as $(X_0, Y_0)$, where $X_0$ is the horizontal coordinate of the center point M, and $Y_0$ is the vertical coordinate of the center point M. The edge detection ROI box T has a length defined as $D_p$ and a width defined as $D_q$. It can be understood that after the center point N of the edge detection ROI box T is displaced to the center point M of the initial positioning edge, the coordinates of the center point N of the edge detection ROI box T and the coordinates of the center point M of the initial positioning edge are the same and are both $(X_0, Y_0)$. Coordinates of four vertexes U, V, W, and Z of the edge detection ROI box T respectively correspond to $(X_0-D_p/2, Y_0-D_q/2)$, $(X_0-D_p/2, Y_0+D_q/2)$, $(X_0+D_p/2, Y_0+D_q/2)$, and $(X_0+D_p/2, Y_0-D_q/2)$. It can be understood that the length and width of the edge detection ROI box T can be set as required.

The foregoing detection method can allow the ROI box T to be quickly positioned to the initial positioning edge, shortening the edge detection time, reducing the control risk, and further improving the detection efficiency and precision.

Figure 12:
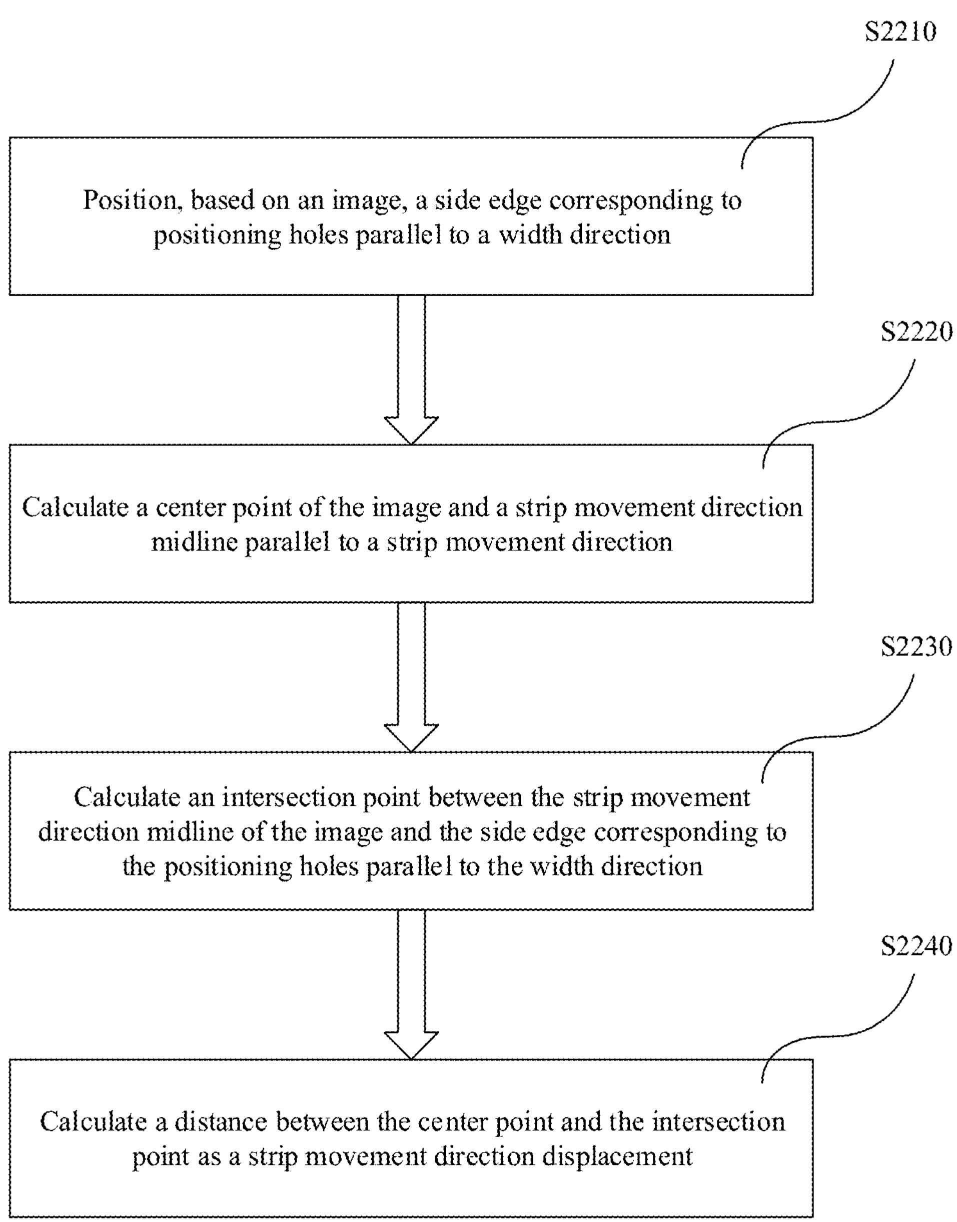
FIG. 12 is a flowchart of calculation of a strip movement direction displacement based on an image according to some embodiments of this application.
Figure 13:
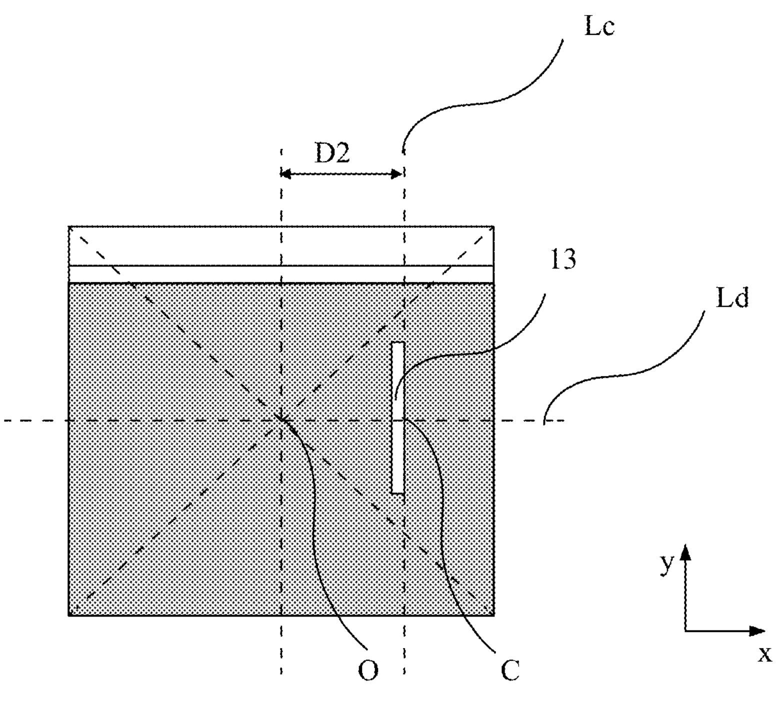
FIG. 13 is a schematic diagram of calculating a strip movement direction displacement based on an image according to some embodiments of this application.

According to some embodiments of this application, referring to FIG. 12 and FIG. 13, the displacement characteristic quantity includes a strip movement direction displacement D2, and step S2000 includes step S2200 of calculating the strip movement direction displacement D2, step S2200 including: step S2210: positioning, based on the image 4, a side edge $L_c$ corresponding to the positioning holes 13 parallel to a width direction; step S2220: calculating a center point O of the image and a strip movement direction midline $L_d$ parallel to a strip movement direction; step S2230: calculating an intersection point C between the strip movement direction midline $L_d$ of the image 4 and the side edge $L_c$ corresponding to the positioning holes 13 parallel to the width direction; and step S2240: calculating a distance between the center point O and the intersection point C as the strip movement direction displacement D2.

Still referring to FIG. 13, in some embodiments, a direction x in FIG. 13 is defined as the strip movement direction, a direction y perpendicular to the direction x is defined as the width direction, and the strip movement direction midline $L_d$ parallel to the strip movement direction is a line that passes through the center point O of the image 4 and is parallel to the direction y as the strip movement direction. When the positioning hole 13 is circular, the side edge $L_c$, positioned based on the image 4, corresponding to the positioning holes 13 parallel to the width direction refers to an edge line tangent to the positioning hole 13 and parallel to the width direction. When the positioning hole 13 is rectangular or square, the side edge $L_c$, positioned based on the image 4, corresponding to the positioning holes 13 parallel to the width direction is a side edge line corresponding to the positioning holes 13 parallel to the width direction. The side edge $L_c$ may be an inner side edge or outer side edge corresponding to the positioning holes 13 parallel to the width direction. In some embodiments, the side edge $L_c$ is the outer side edge corresponding to the positioning holes 13 parallel to the width direction. In some embodiments, in response to an absolute value of a difference between the strip movement direction displacement D2 and a predetermined strip movement direction displacement being greater than a threshold, alarm information is sent for alerting. In some embodiments, in response to the absolute value of the difference between the strip movement direction displacement D2 and the predetermined strip movement direction displacement being greater than the threshold, the control system performs displacement correction in the strip movement direction based on the difference between the strip movement direction displacement D2 and the predetermined strip movement direction displacement to achieve automatic detection and displacement correction.

The foregoing detection method can detect both the width direction displacement D1 and strip movement direction displacement D2 of the anode composite strip 1 on one image, which feature high detection efficiency, accuracy, and precision, and can increase the detection speed and reduce the malfunction rate.

Figure 14:
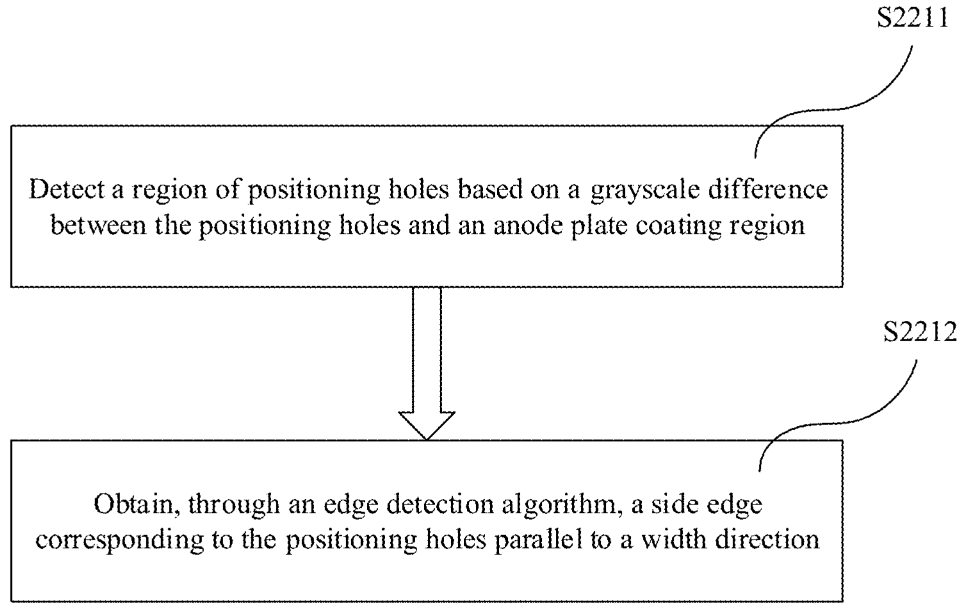
FIG. 14 is a flowchart of positioning, based on an image, a side edge corresponding to positioning holes parallel to a width direction according to some embodiments of this application.

According to some embodiments of this application, referring to FIG. 14, step S2210 includes: step S2211: detecting a region of the positioning holes 13 based on grayscale differences between the positioning holes 13 and the anode plate coating region 14; and step S2212: obtaining, through an edge detection algorithm, the side edge $L_c$ of the positioning holes 13 parallel to the width direction.

The processed positioning holes 13 shows a grayscale different from that of the anode plate coating region 14 coated with the anode active material. Therefore, the positioning holes 13 can be quickly detected on the image 4 based on the grayscale differences between the positioning holes 13 and the anode plate coating region 14. A region with a grayscale value within a predetermined value range is extracted as the region of the positioning holes 13. In some embodiments, a range greater than 50 is selected as the predetermined value range of the extracted grayscale value. In some embodiments, step S2211 includes: step S2211*a*: determining whether a region with a grayscale value greater than the predetermined value range is present in the extracted anode plate coating region 14; step S2211*b*: in response to presence of the region with the grayscale value greater than the predetermined value range in the anode plate coating region 14, extracting the region; step S2211*c*: determining whether the extracted region fits with the size of the positioning holes; step S2211*d*: in response to the region fitting with the size of the positioning holes, entering step S2212; and step S2211*e*: in response to presence of the region with the grayscale value greater than the predetermined value range in the middle of the anode plate coating region 14 or the extracted region not fitting with the size of the positioning holes 13, sending alarm information to the control system to indicate that the positioning holes 13 is not found.

The foregoing detection method can quickly position the side edge $L_c$ of the positioning holes 13 parallel to the width direction, facilitating the calculation of the strip movement direction displacement D2, thereby improving the detection efficiency and shortening the detection time.

Figure 15:
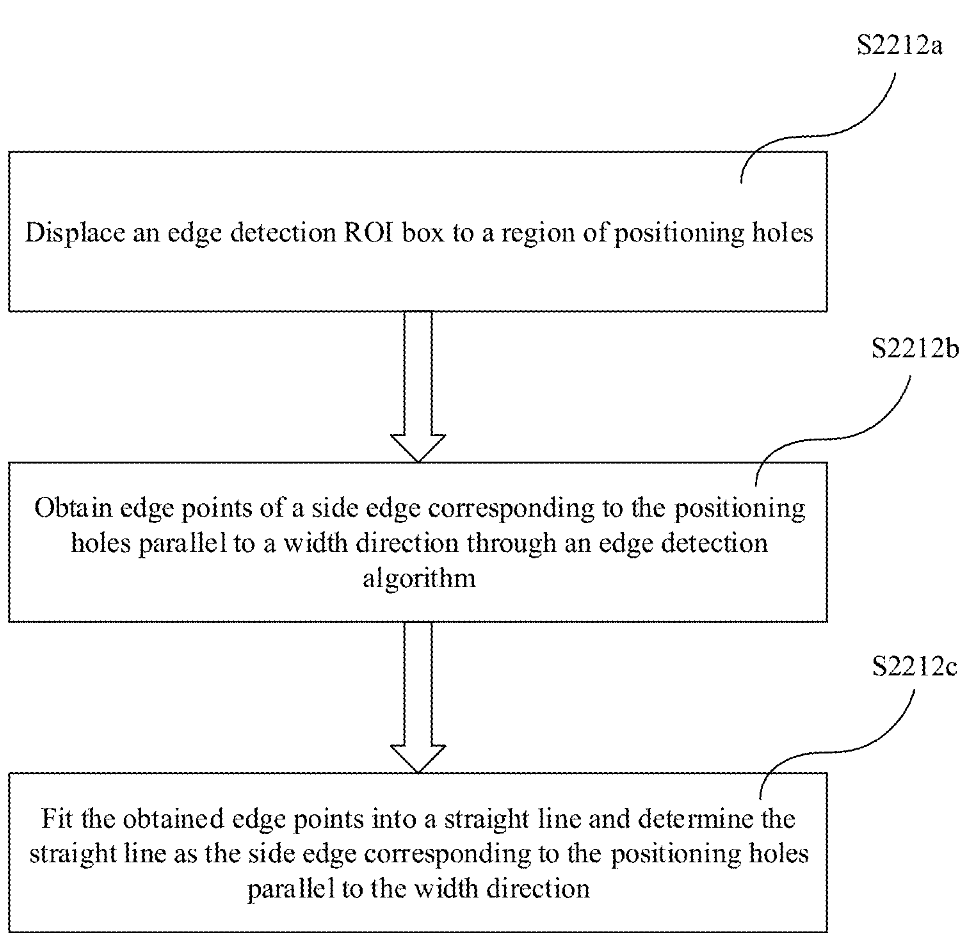
FIG. 15 is a flowchart of obtaining, through an edge detection algorithm, a side edge corresponding to positioning holes parallel to a width direction according to some embodiments of this application.

According to some embodiments of this application, referring to FIG. 15, step S2212 includes: step S2212*a*: displacing an edge detection ROI box T to the region of the positioning holes 13; step S2212*b*: obtaining, through the edge detection algorithm, edge points of the side edge $L_c$ of the positioning holes 13 parallel to the width direction; and step S2212*c*: fitting the obtained edge points into a straight line and determining the straight line as the side edge $L_c$ of the positioning holes 13 parallel to the width direction.

In some embodiments, a determining step present between step S2212*b* and step S2212*c* includes: when the number of the edge points obtained through the edge detection algorithm is greater than or equal to a threshold of the number of edge points, fitting the obtained edge points into a straight line; and when the number of the edge points obtained through the edge detection algorithm is smaller than the threshold of the number of edge points, sending alarm information to indicate failure in edge detection. In some embodiments, abnormal edge points are removed by filtering, and the obtained edge points are fitted into a straight line using the least square method.

The foregoing detection method can accurately extract from the image 4 the side edge $L_c$ of the positioning holes 13 parallel to the width direction, featuring quick edge detection and high fitting precision.

Figure 16:
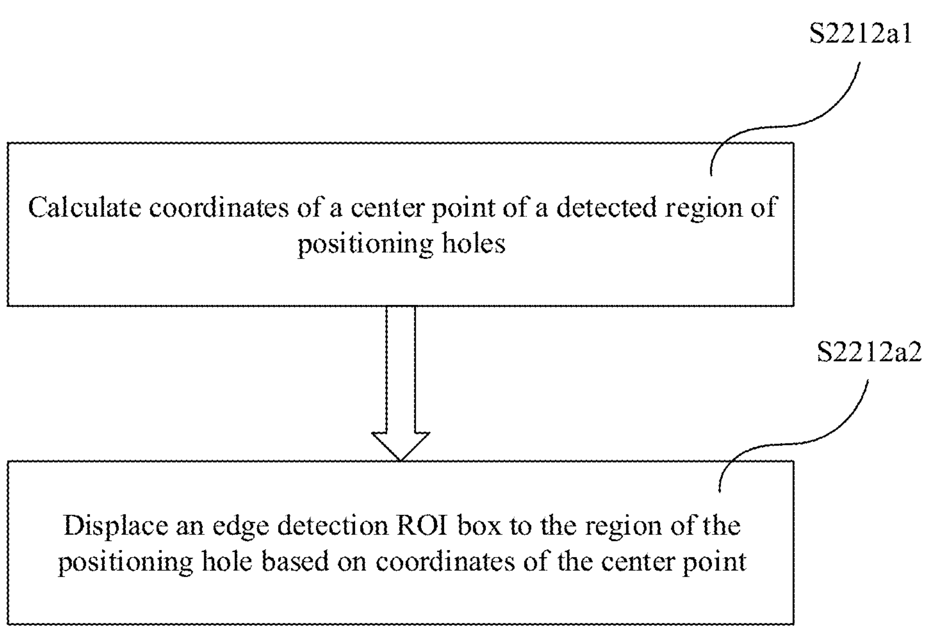
FIG. 16 is a flowchart of displacing an edge detection ROI box to a region of positioning holes according to some embodiments of this application.
Figure 17:
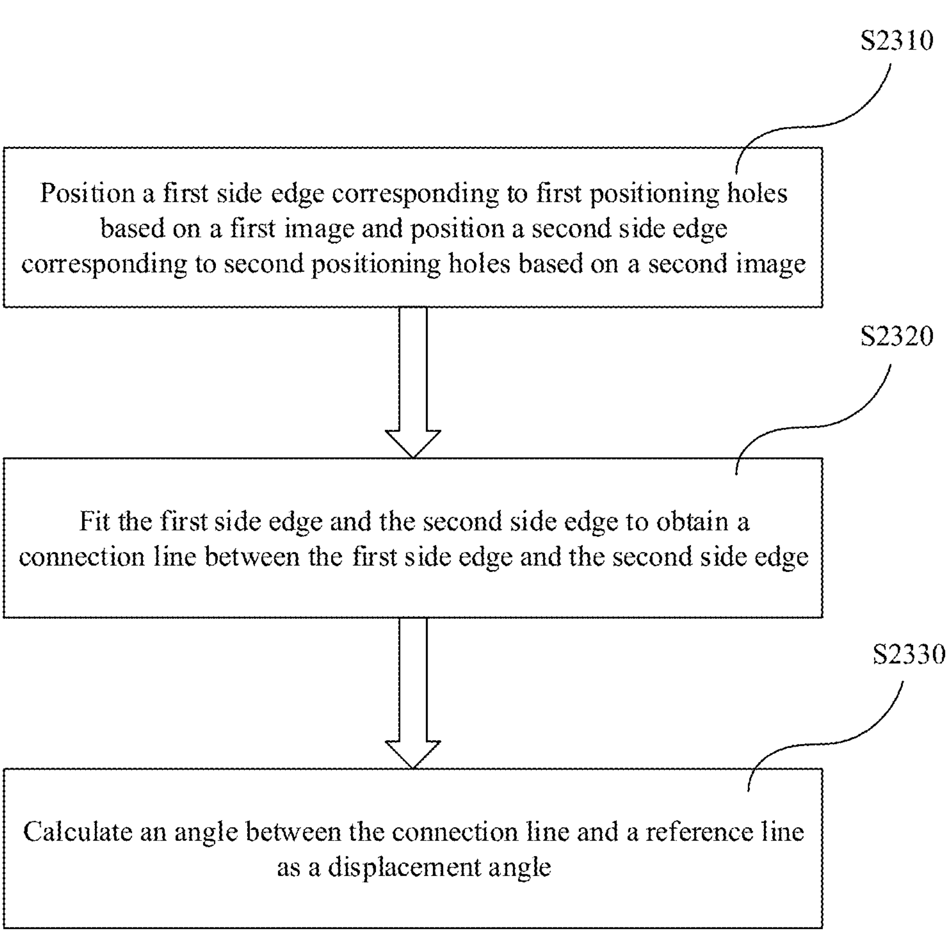
FIG. 17 is a flowchart of calculating a displacement angle based on an image according to some embodiments of this application.
Figures 18, 19:
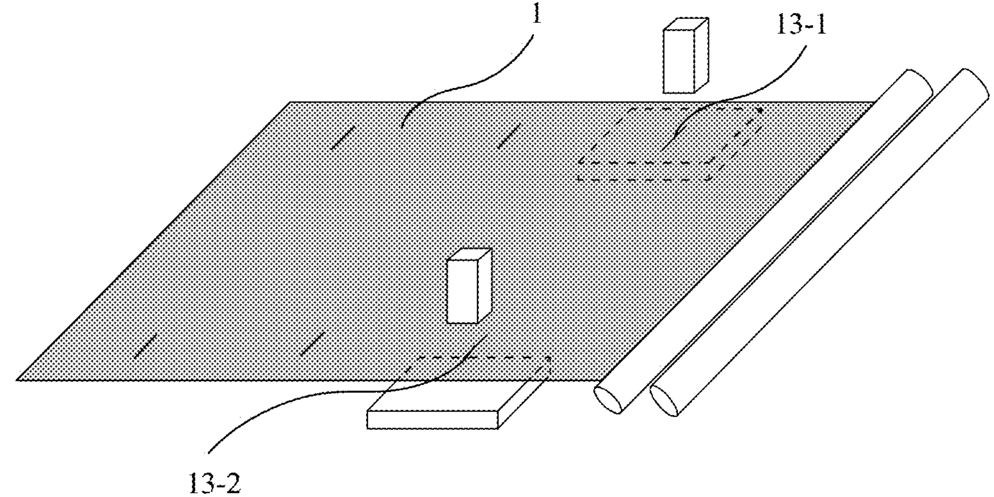
FIG. 18 is a schematic diagram of obtaining a first image and a second image according to some embodiments of this application.
FIG. 19 is a schematic diagram of an anode plate according to some embodiments of this application.
Figure 20:
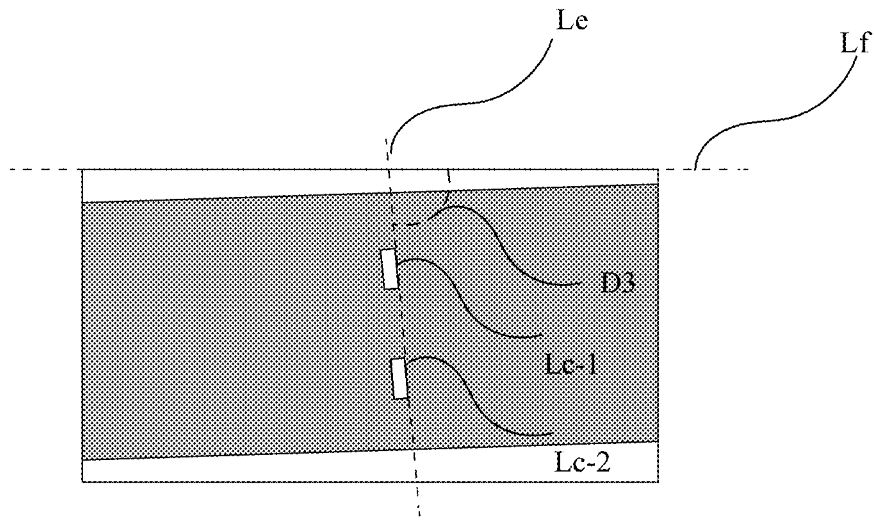
FIG. 20 is a schematic diagram of calculating a displacement angle based on an image according to some embodiments of this application.

According to some embodiments of this application, referring to FIG. 16, step S2212*a* includes: step S2212*a*1: calculating coordinates of a center point of the detected region of the positioning holes 13; and step S2212*a*2: displacing the edge detection ROI box T to the region of the positioning holes 13 based on the coordinates of the center point.

In some embodiments, the coordinates of the center point of the region of the positioning holes 13 are defined as $(X_1, Y_1)$. Step S2212*a*2 includes displacing a center point N of the edge detection ROI box T to the coordinates $(X_1, Y_1)$ of the center point of the positioning holes 13, where the center point N of the edge detection ROI box T is an intersection point between connection lines of diagonal lines of the edge detection ROI box T. The edge detection ROI box T has a length defined as $D_p$ and a width defined as $D_q$. It can be understood that after the center point N of the edge detection ROI box T is displaced to the center point of the region of the positioning holes 13, the coordinates of the center point N of the edge detection ROI box T and the coordinates of the center point of the region of the positioning holes 13 are the same and are both $(X_1, Y_1)$. Coordinates of four vertexes U, V, W, and Z of the edge detection ROI box T respectively correspond to $(X_1-D_p/2, Y_1-D_q/2)$, $(X_1-D_p/2, Y_1+D_q/2)$, $(X_1+D_p/2, Y_1+D_q/2)$, and $(X_1+D_p/2, Y_1-D_q/2)$. It can be understood that the length and width of the edge detection ROI box T can be set as required.

The foregoing detection method can allow the ROI box T to be quickly positioned to the positioning holes, shortening the edge detection time, further improving the detection efficiency and precision.

According to some embodiments of this application, referring to FIG. 17 to FIG. 20, the anode plate 11 includes first positioning holes 13-1 and second positioning holes 13-2, the first positioning holes 13-1 and the second positioning holes 13-2 being spaced apart in a width direction and respectively having a first side edge $L_c$-1 and a second side edge $L_c$-2 parallel to the width direction, with the first side edge $L_c$-1 and the second side edge $L_c$-2 arranged collinearly. Step S1000 includes obtaining a first image of a portion of the anode composite strip 1 including the first positioning holes 13-1 and a second image of a portion of the anode composite strip including the second positioning holes 13-2, where the displacement characteristic quantity includes a displacement angle D3. Step S2000 includes step S2300 of calculating the displacement angle D3, step S2300 including: step S2310: positioning the first side edge $L_c$-1 of the first positioning hole 13-1 based on the first image and positioning the second side edge $L_c$-2 of the second positioning hole 13-2 based on the second image; step S2320: fitting the first side edge $L_c$-1 and the second side edge $L_c$-2 to obtain a connection line $L_e$ between the first side edge $L_c$-1 and the second side edge $L_c$-2; and step S2330: calculating an angle between the connection line $L_e$ and a reference line as the displacement angle D3, where the reference line is a contour line $L_f$ parallel to the first image or the second image and parallel to a strip movement direction.

It can be understood that the first side edge $L_c$-1 and the second side edge $L_c$-2 being both parallel to the width direction and arranged collinearly means that the first side edge $L_c$-1 and the second side edge $L_c$-2 are both located at one side of the positioning holes 13, one side of the positioning holes 13 facing toward the strip movement direction of the anode composite strip 1, or one side of the positioning holes 13 facing away from the strip movement direction of the anode composite strip 1. In some embodiments, the portion of the anode composite strip 1 including the first positioning holes 13-1 and the portion of the anode composite strip 1 including the second positioning holes 13-2 are symmetrical with respect to a longitudinal center axis in the strip movement direction of the anode plate coating region 14. In some embodiments, the first positioning holes 13-1 and the second positioning holes 13-2 are symmetrical with respect to the longitudinal center axis in the strip movement direction of the anode plate coating region 14. In some embodiments, the first image of the portion of the anode composite strip 1 including the first positioning holes 13-1 and the second image of the portion of the anode composite strip 1 including the second positioning holes 13-2 are obtained simultaneously. In some embodiments, in response to incapability of obtaining the first image and the second image simultaneously, alarm information is sent for alerting. In some embodiments, step S2320 includes mapping edge points of the obtained first side edge $L_c$-1 and second side edge $L_c$-2 to a same spatial coordinate system through a joint calibration model, and fitting the mapped edge points through the least square method to form the connection line $L_e$. In some embodiments, in response to an absolute value of a difference between the displacement angle D3 and a preset angle being greater than a threshold, alarm information is sent for alerting. In some embodiments, in response to the absolute value of the difference between the displacement angle D3 and the preset angle being greater than the threshold, the control system performs displacement correction based on the difference between the displacement angle D3 and the preset angle to achieve closed-loop control so as to achieve automatic detection and displacement correction.

The foregoing detection method can quickly and efficiently detect slight angle displacement of the anode composite strip 1 at low costs, which features high detection efficiency, accuracy, and precision, and can increase the response speed of the control system and reduce the malfunction rate. The first image of the portion of the anode composite strip 1 including the first positioning holes 13-1 and the second image of the portion of the anode composite strip 1 including the second positioning holes 13-2 are jointly used for calculating the displacement angle D3. Compared with single-image detection, this detection method can broaden the detection range, is applicable to anode composite strips 1 with larger widths, can position the position of the positioning holes 13 more accurately, and has higher detection precision.

Figure 21:
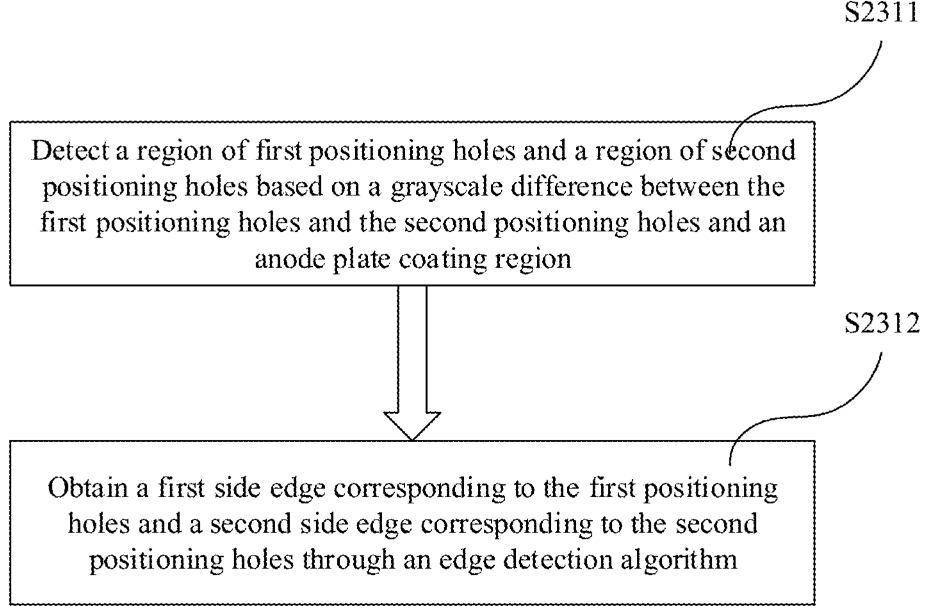
FIG. 21 is a flowchart of positioning a first side edge corresponding to first positioning holes based on a first image and positioning a second side edge corresponding to second positioning holes based on a second image according to some embodiments of this application.

According to some embodiments of this application, referring to FIG. 21, step S2310 includes: step S2311: detecting a region of the first positioning hole 13-1 and a region of the second positioning hole 13-2 based on grayscale differences between the first positioning hole 13-1 and the second positioning hole 13-2 and the anode plate coating region 14; and step S2312: obtaining the first side edge $L_c$-1 of the first positioning hole 13-1 and the second side edge $L_c$-2 of the second positioning hole 13-2 through an edge detection algorithm.

For a method for extracting the first positioning holes 13-1 and the second positioning holes 13-2, refer to step S2211.

The foregoing detection method can quickly position the first side edge $L_c$-1 of the first positioning hole 13-1 and the second side edge $L_c$-2 of the second positioning hole 13-2, facilitating the calculation of the displacement angle D3, thereby improving the detection efficiency, accuracy, and precision.

Figure 22:
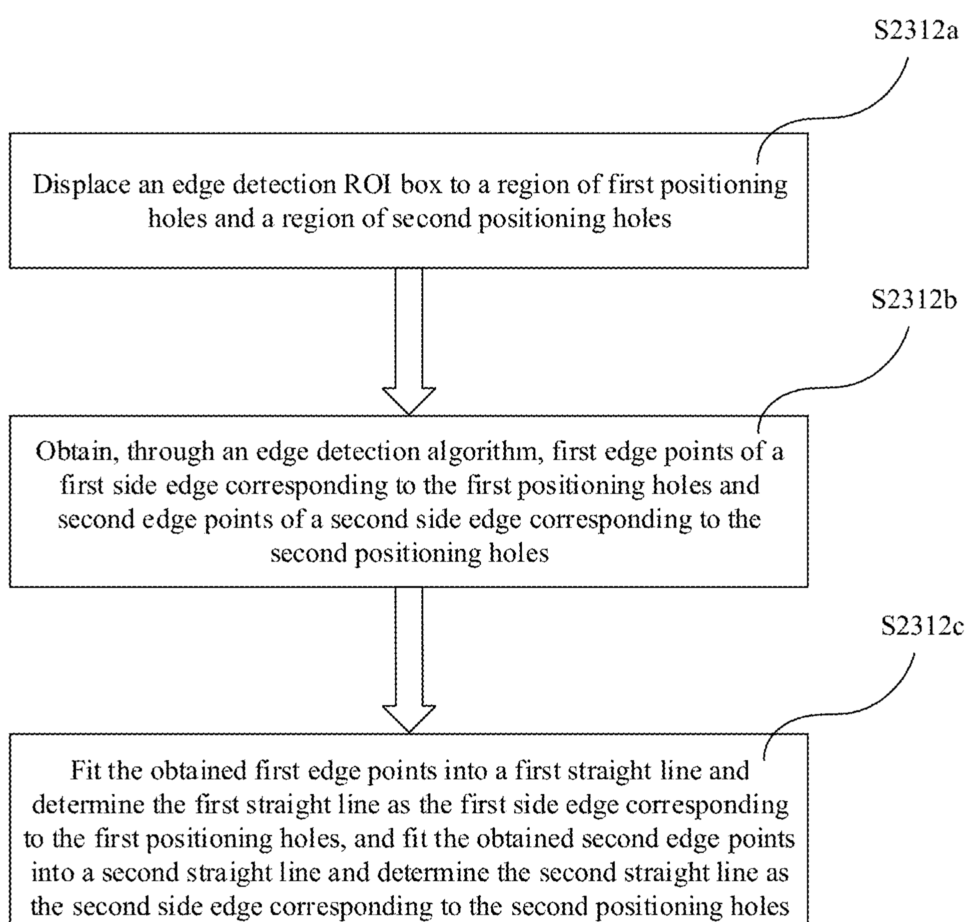
FIG. 22 is a flowchart of obtaining a first side edge corresponding to first positioning holes and a second side edge corresponding to second positioning holes through an edge detection algorithm according to some embodiments of this application.

According to some embodiments of this application, referring to FIG. 22, step S2312 includes: step S2312*a*: displacing an edge detection ROI box T to the region of the first positioning hole 13-1 and the region of the second positioning hole 13-2; step S2312*b*: obtaining first edge points of the first side edge $L_c$-1 of the first positioning hole 13-1 and second edge points of the second side edge $L_c$-2 of the second positioning hole 13-2 through the edge detection algorithm; and step S2312*c*: fitting the obtained first edge points into a first straight line and determining the first straight line as the first side edge $L_c$-1 of the first positioning hole 13-1, and fitting the obtained second edge points into a second straight line and determining the second straight line as the second side edge $L_c$-2 of the second positioning hole 13-2.

For a method for fitting the first side edge $L_c$-1 and the second side edge $L_c$-2, refer to step S2212.

The foregoing detection method can accurately extract the first side edge $L_c$-1 of the first positioning hole 13-1 and the second side edge $L_c$-2 of the second positioning hole 13-2 from the first image and the second image respectively, featuring quick edge detection and high fitting precision, thereby increasing the detection speed.

Figure 23:
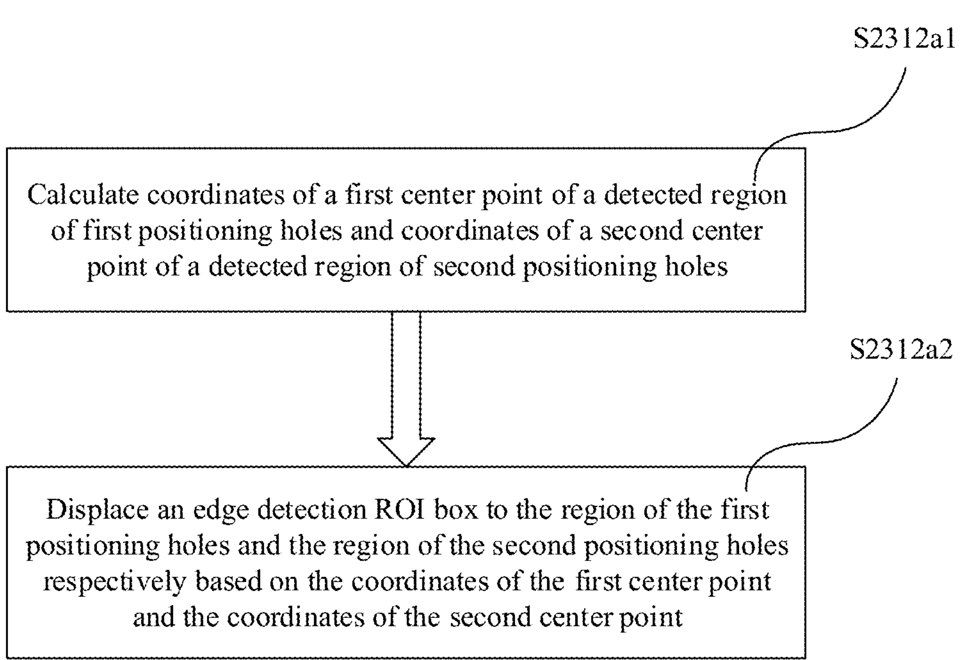
FIG. 23 is a flowchart of displacing of an edge detection ROI box to a region of first positioning holes and a region of second positioning holes according to some embodiments of this application.

According to some embodiments of this application, referring to FIG. 23, step S2312*a* includes: step S2312*a*1: calculating coordinates of a first center point of the detected region of the first positioning hole 13-1 and coordinates of a second center point of the detected region of the second positioning hole 13-2; and step S2312*a*2: displacing the edge detection ROI box T to the region of the first positioning hole 13-1 and the region of the second positioning hole 13-2 separately based on the coordinates of the first center point and the coordinates of the second center point.

For a method for displacing the edge detection ROI box T, refer to step S2212*a*.

The foregoing detection method can allow the ROI box T to be quickly positioned to the first positioning holes 13-1 and the second positioning holes 13-2, shortening the edge detection time, further improving the detection efficiency and precision, and increasing the detection speed.

Figure 24:
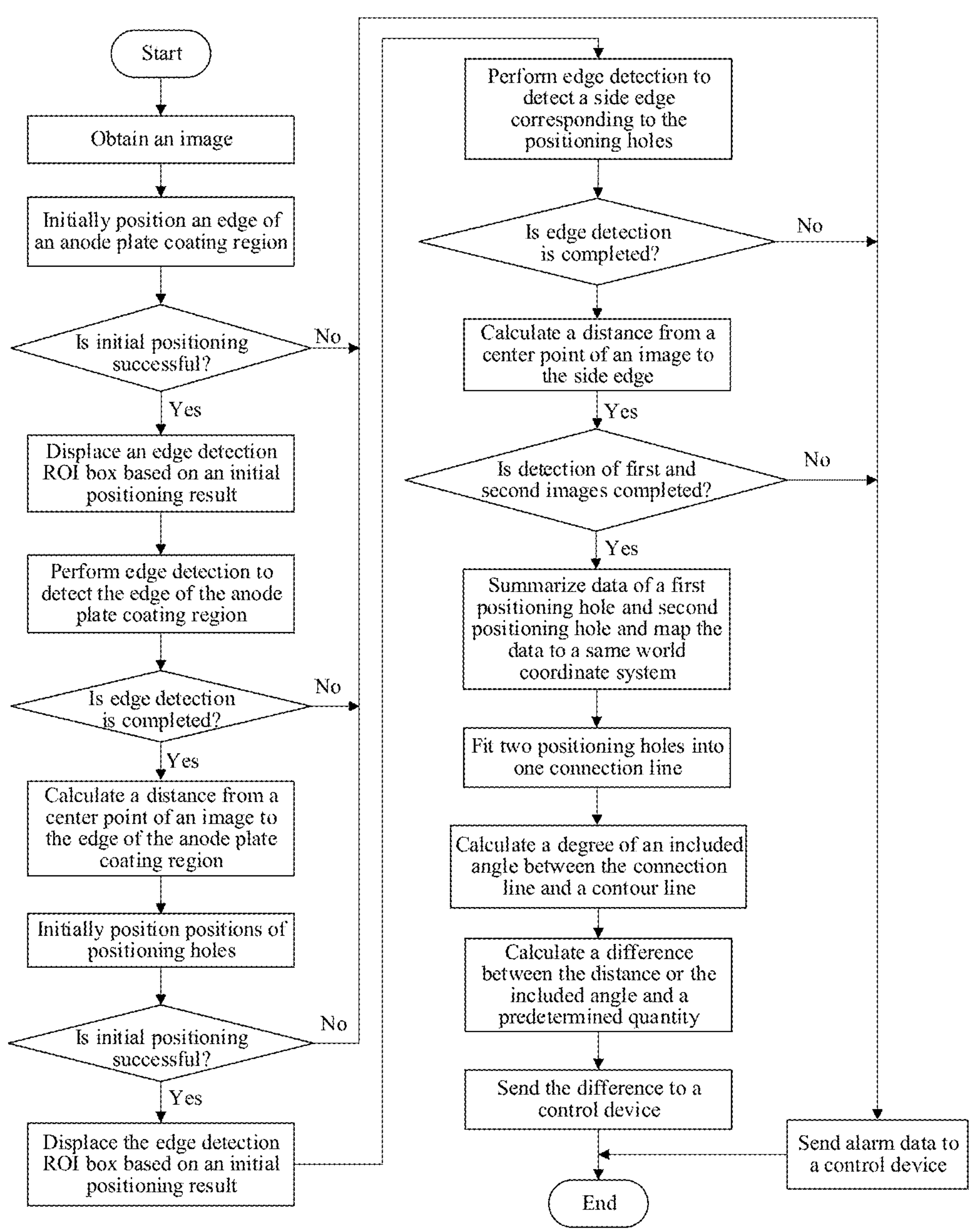
FIG. 24 is a flowchart of a displacement detection method for anode composite strip according to some other embodiments of this application.

According to some embodiments of this application, referring to FIG. 24, the displacement detection method for anode composite strip 1 includes: obtaining an image 4 of a portion of the anode composite strip 1 including positioning holes 13; extracting an outer side edge of an anode plate coating region 14 parallel to a strip movement direction as an initial positioning edge; in response to success in extracting the initial positioning edge, displacing an edge detection ROI box T to the initial positioning edge; in response to failure in extracting the initial positioning edge, sending alarm data to a control device; fitting, through an edge detection algorithm, an edge $L_a$ of the anode plate coating region 14 parallel to a strip movement direction; in response to success in fitting the edge $L_a$ of the anode plate coating region 14 parallel to the strip movement direction, calculating a distance D1 between a center point O of the image 4 and an intersection point between a width direction midline $L_b$ of the image 4 and the edge $L_a$ of the anode plate coating region 14 parallel to the strip movement direction, and taking this distance as a width direction displacement; in response to failure in fitting the edge $L_a$ of the anode plate coating region 14 parallel to the strip movement direction, sending alarm data to the control device; detecting a region of the positioning holes 13 in the image 4; in response to success in extracting the region of the positioning holes 13 in the image 4, displacing the edge detection ROI box T to the region of the positioning holes 13; in response to failure in extracting the region of the positioning holes 13 in the image 4, sending alarm data to the control device; fitting a side edge $L_c$ of the positioning holes 13 parallel to a width direction through the edge detection algorithm; in response to success in fitting the side edge $L_c$ of the positioning holes 13 parallel to the width direction, calculating a distance D2 between the center point O of the image and a strip movement direction midline $L_d$ of the image and the side edge $L_c$ of the positioning holes 13 parallel to the width direction, and taking this distance as a strip movement direction displacement; in response to failure in fitting the side edge corresponding to the positioning holes parallel to the width direction, sending alarm data to the control device; in response to success in obtaining both a first image and a second image, summarizing edge point data of a first side edge $L_c$-1 of the first image and a second side edge $L_c$-2 of the second image and mapping the edge point data to a same world coordinate system; in response to failure in obtaining the first image or the second image, sending alarm data to the control device; fitting the edge point data of the first side edge $L_c$-1 and the second side edge $L_c$-2 through the least square method to obtain a connection line $L_e$ between the first side edge $L_c$-1 and the second side edge $L_c$-2; calculating an angle D3 between the connection line $L_e$ and a reference line and taking this angle as a displacement angle, where the reference line is a contour line $L_f$ parallel to the first image or the second image and parallel to the strip movement direction; and calculating differences between the distance and the angle and their respective predetermined quantities, and sending the differences to the control device.

Figure 25:
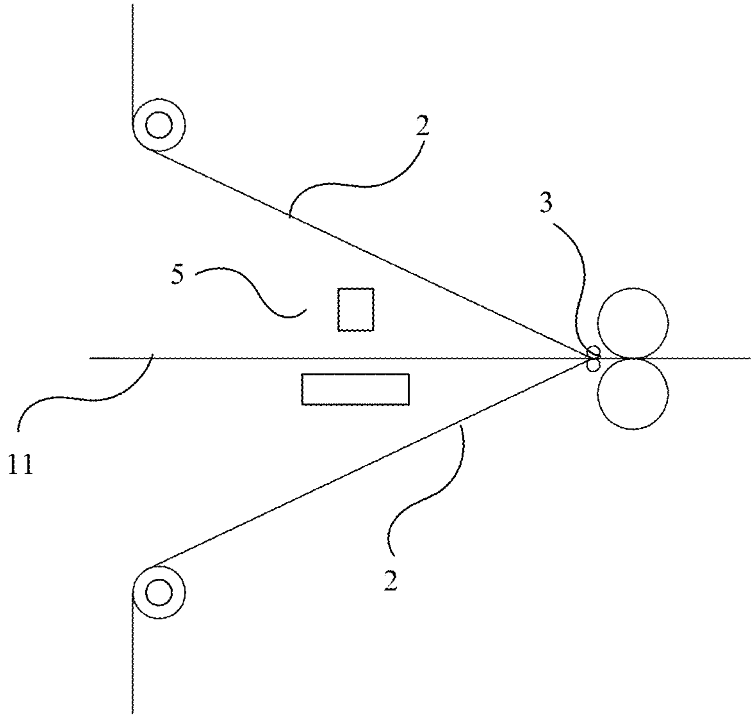
FIG. 25 is a schematic diagram of a displacement detection apparatus for anode composite strip according to some embodiments of this application.

According to some embodiments of this application, referring to FIG. 1, FIG. 2, and FIG. 25, a displacement detection apparatus for anode composite strip 1 is provided. The anode composite strip 1 includes an anode plate 11 and a separator 12 attached to a surface of the anode plate 11, where the anode plate 11 includes positioning holes 13. The displacement detection apparatus includes: an image obtaining device 5, the image obtaining device 5 being configured to obtain an image 4 of a portion of the anode composite strip 1 including the positioning holes 13; and a controller (not shown in figure), the controller being configured to receive the image 4 obtained by the image obtaining device 5; a memory; and a processor, the processor being configured to execute instructions stored in the memory to perform the method according to any one of the foregoing embodiments.

After the anode plate 11 is laminated with the separator 12, this displacement detection apparatus can still effectively detect the positioning holes 13, improving accuracy and precision of displacement detection. In addition, with high detection efficiency, any one or any combination of a width direction displacement D1, a strip movement direction displacement D2, and a displacement angle D3 can also be detected while calculating a displacement characteristic quantity based on the image 4 obtained by the image obtaining device 5, thereby reducing the detection cost.

Figure 26:
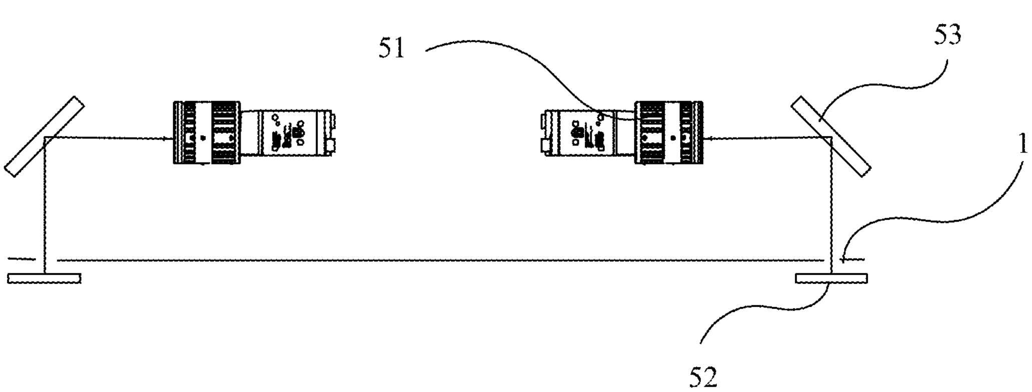
FIG. 26 is a schematic diagram of an image obtaining device according to some embodiments of this application.

According to some embodiments of this application, referring to FIG. 26, the image obtaining device 5 includes: a camera 51, the camera 51 being disposed on a first side of the anode composite strip 1; and a light source 52, the light source 52 being provided on a second side of the anode composite strip 1 opposite the first side.

The camera 51 may be any device capable of capturing images, for example, an industrial camera or an area-array camera. The light source 52 may be any light source capable of irradiating the anode composite strip 1, such as laser. In some embodiments, light emitted from the light source 52 is focused on the positioning holes 13 for lighting during hole cutting. In some embodiments, the image obtaining device 5 further includes a prism 53 for changing an angle of light incidence.

The camera has a wide field of view, can obtain images around the positioning holes in a large area, can still detect the displacement characteristic quantity although some of the positioning holes are blocked, and features high detection accuracy and precision.

In some embodiments, the light source 52 is a red light source.

With a wavelength of 625 nanometers to 740 nanometers (nm), red light is color light with the longest wavelength in visible light, which is especially applicable to the anode composite strip 1 laminated with the separator 12.

In some embodiments, the light source 52 has high luminance, for example, the luminance may be 100,000 $L_x$ or above. In this way, the image detection effect can be further improved.

With strong light wave penetration, the red light source can improve the resolution of the positioning holes 13 in the image 4 and accurately position the positioning holes 13, thereby improving the detection accuracy of the displacement characteristic quantity.

According to some embodiments of this application, a delivery apparatus for anode composite strip 1 is provided. The anode composite strip 1 includes an anode plate 11 and a separator 12 attached to a surface of the anode plate 11, where the anode plate 11 includes positioning holes 13. The delivery apparatus includes: the displacement detection apparatus according to any one of the foregoing embodiments; and a control device in communication connection with the displacement detection apparatus, the control device being configured to control an operation of the delivery apparatus according to a displacement characteristic quantity output by the displacement detection apparatus.

The foregoing delivery apparatus for anode composite strip can quickly and accurately detect the displacement characteristic quantity in transfer of the anode composite strip. The control device can make a timely response to displacement of the anode composite strip to reduce the malfunction rate.

According to some embodiments of this application, a computer-readable storage medium is provided, where executable instructions are stored in the computer-readable storage medium, and when the instructions are executed by a processor, the processor performs the method according to any one of the foregoing embodiments.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the foregoing embodiments or make equivalent replacements to some or all technical features thereof without departing from the scope of the technical solutions of the embodiments of this application. All such modifications and equivalent replacements shall fall within the scope of claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. A method performed by a delivery apparatus comprising a displacement detection apparatus and a controller device in communication with the displacement detection apparatus, the displacement detection apparatus comprising a processor, the method comprising:

step S1000: obtaining, by the displacement detection apparatus, an image of a portion of an anode composite strip, wherein the anode composite strip comprises an anode plate and a separator attached to a surface of the anode plate, the anode plate comprising positioning holes; and step S2000: calculating, by the displacement detection apparatus, a displacement characteristic quantity based on the image, wherein the displacement characteristic quantity indicates a displacement distance and/or angle of the anode composite strip in a specified direction, the displacement characteristic quantity is sent to the controller device;

receiving, by the controller device, the displacement characteristic quantity; and controlling, by the controller device, an operation of the delivery apparatus according to the displacement characteristic quantity, wherein the displacement characteristic quantity comprises a width direction displacement, wherein step S2000 comprises step S2100 of calculating the width direction displacement, step S2100 comprising:

step S2110: positioning, based on the image, an edge of an anode plate coating region parallel to a strip movement direction;

step S2120: calculating a center point of the image and a width direction midline parallel to a width direction;

step S2130: calculating an intersection point between the width direction midline of the image and the edge of the anode plate coating region parallel to the strip movement direction; and step S2140: calculating a distance between the center point and the intersection point as the width direction displacement.

2. The method according to claim 1, wherein step S2110 comprises:

step S2111: extracting the anode plate coating region through a threshold processing algorithm based on grayscale differences between the anode plate coating region and other regions of the anode composite strip;

step S2112: fitting a bounding rectangle of the extracted anode plate coating region; and step S2113: determining, based on the bounding rectangle, the edge of the anode plate coating region parallel to the strip movement direction.

3. The displacement detection method according to claim 2, wherein step S2113 comprises:

step S2113*a*: taking an outer side edge of the bounding rectangle parallel to the strip movement direction as an initial positioning edge;

step S2113*b*: displacing an edge detection ROI box to the initial positioning edge;

step S2113*c*: obtaining edge points through an edge detection algorithm; and step S2113*d*: fitting the obtained edge points into a straight line and determining the straight line as the edge of the anode plate coating region parallel to the strip movement direction.

4. The displacement detection method according to claim 3, wherein step S2113*b* comprises:

step S2113*b*1: calculating coordinates of the center point of the initial positioning edge; and step S2113*b*2: displacing the edge detection ROI box to the initial positioning edge based on the coordinates of the center point.

5. The method according to claim 1, wherein the anode plate comprises first positioning holes and second positioning holes, the first positioning holes and the second positioning holes being spaced apart in a width direction and respectively having a first side edge and second side edge parallel to the width direction, with the first side edge and the second side edge arranged collinearly;

step S1000 comprises obtaining a first image of a portion of the anode composite strip comprising the first positioning holes and a second image of a portion of the anode composite strip comprising the second positioning holes; and the displacement characteristic quantity comprises a displacement angle, and step S2000 comprises step S2300 of calculating the displacement angle, step S2300 comprising:

step S2310: positioning the first side edge corresponding to the first positioning holes based on the first image and positioning the second side edge corresponding to the second positioning holes based on the second image;

step S2320: fitting the first side edge and the second side edge to obtain a connection line between the first side edge and the second side edge; and step S2330: calculating an angle between the connection line and a reference line as the displacement angle, wherein the reference line is a contour line parallel to the first image or the second image and parallel to a strip movement direction.

6. The method according to claim 5, wherein step S2310 comprises:

step S2311: detecting a region of each of the first positioning holes and a region of each of the second positioning holes based on grayscale differences between the first positioning hole and the second positioning hole and an anode plate coating region; and step S2312: obtaining the first side edge corresponding to the first positioning holes and the second side edge corresponding to the second positioning holes through an edge detection algorithm.

7. The method according to claim 6, wherein step S2312 comprises:

step S2312*a*: displacing an edge detection ROI box to the region of each of the first positioning holes and the region of each of the second positioning holes;

step S2312*b*: obtaining, through the edge detection algorithm, first edge points of the first side edge corresponding to the first positioning holes and second edge points of the second side edge corresponding to the second positioning holes; and step S2312*c*: fitting the obtained first edge points into a first straight line and determining the first straight line as the first side edge corresponding to the first positioning holes, and fitting the obtained second edge points into a second straight line and determining the second straight line as the second side edge corresponding to the second positioning holes, wherein step S2312*a* comprises:

step S2312*a*1: calculating coordinates of a first center point of the detected region of the first positioning hole and coordinates of a second center point of the detected region of the second positioning hole; and step S2312*a*2: displacing the edge detection ROI box to the region of the first positioning hole and the region of the second positioning hole separately based on the coordinates of the first center point and the coordinates of the second center point.

8. A non-transitory computer-readable storage medium, wherein executable instructions are stored in the computer-readable storage medium, and the instructions when executed on a processor cause the processor to perform the method according to claim 1.

9. A method performed by a delivery apparatus comprising a displacement detection apparatus and a controller device in communication with the displacement detection apparatus, the displacement detection apparatus comprising a processor, the method comprising:

step S1000: obtaining, by the displacement detection apparatus, an image of a portion of an anode composite strip, wherein the anode composite strip comprises an anode plate and a separator attached to a surface of the anode plate, the anode plate comprising positioning holes; and step S2000: calculating, by the displacement detection apparatus, a displacement characteristic quantity based on the image, wherein the displacement characteristic quantity indicates a displacement distance and/or angle of the anode composite strip in a specified direction;

receiving, by the controller device, the displacement characteristic quantity; and controlling, by the controller device, an operation of the delivery apparatus according to the displacement characteristic quantity, wherein the displacement characteristic quantity comprises a strip movement direction displacement, and step S2000 comprises step S2200 of calculating the strip movement direction displacement, step S2200 comprising:

step S2210: positioning, based on the image, a side edge corresponding to the positioning holes parallel to a width direction;

step S2220: calculating a center point of the image and a strip movement direction midline parallel to a strip movement direction;

step S2230: calculating an intersection point between the strip movement direction midline of the image and the side edge corresponding to the positioning holes parallel to the width direction; and step S2240: calculating a distance between the center point and the intersection point as the strip movement direction displacement.

10. The method according to claim 9, wherein step S2210 comprises:

step S2211: detecting a region of the positioning holes based on grayscale differences between the positioning holes and an anode plate coating region; and step S2212: obtaining, through an edge detection algorithm, the side edge corresponding to the positioning holes parallel to the width direction.

11. The displacement detection method according to claim 10, wherein step S2212 comprises:

step S2212*a*: displacing an edge detection ROI box to the region of the positioning holes;

step S2212*b*: obtaining, through the edge detection algorithm, edge points of the side edge corresponding to the positioning holes parallel to the width direction; and step S2212*c*: fitting the obtained edge points into a straight line and determining the straight line as the side edge corresponding to the positioning holes parallel to the width direction, wherein step S2212*a* comprises:

step S2212*a*1: calculating coordinates of a center point of the detected region of the positioning holes; and step S2212*a*2: displacing the edge detection ROI box to the region of the positioning holes based on the coordinates of the center point.

12. A non-transitory computer-readable storage medium, wherein executable instructions are stored in the computer-readable storage medium, and the instructions when executed on a processor cause the processor to perform the method according to claim 9.

13. A delivery apparatus, comprising:

a displacement detection apparatus; and a controller device in communication connection with the displacement detection apparatus, wherein the displacement detection apparatus comprises:

an image obtaining device, the image obtaining device being configured to obtain an image of a portion of an anode composite strip, the anode composite strip comprises an anode plate and a separator attached to a surface of the anode plate, the anode plate comprising positioning holes, the image obtaining device comprises a camera disposed on a first side of the anode composite strip and a light source provided on a second side of the anode composite strip opposite the first side, the light source is a red light source;

a controller, the controller being configured to receive the image obtained by the image obtaining device;

a memory; and a processor, wherein executable instructions are stored in the memory, and the instructions when executed on the processor cause the processor of the displacement detection apparatus to perform:

step S1000: obtaining an image of a portion of an anode composite strip, wherein the anode composite strip comprises an anode plate and a separator attached to a surface of the anode plate, the anode plate comprising positioning holes; and step S2000: calculating a displacement characteristic quantity based on the image, wherein the displacement characteristic quantity indicates a displacement distance and/or angle of the anode composite strip in a specified direction, wherein the displacement characteristic quantity comprises a width direction displacement, wherein step S2000 comprises step S2100 of calculating the width direction displacement, step S2100 comprising:

step S2110: positioning, based on the image, an edge of an anode plate coating region parallel to a strip movement direction;

step S2120: calculating a center point of the image and a width direction midline parallel to a width direction;

step S2130: calculating an intersection point between the width direction midline of the image and the edge of the anode plate coating region parallel to the strip movement direction; and step S2140: calculating a distance between the center point and the intersection point as the width direction displacement, wherein the controller device is configured to receive the displacement characteristic quantity and control an operation of the delivery apparatus according to a displacement characteristic quantity output by the displacement detection apparatus.

14. A delivery apparatus, comprising:

a displacement detection apparatus; and a controller device in communication connection with the displacement detection apparatus, wherein the displacement detection apparatus comprises:

an image obtaining device, the image obtaining device being configured to obtain an image of a portion of an anode composite strip, the anode composite strip comprises an anode plate and a separator attached to a surface of the anode plate, the anode plate comprising positioning holes, the image obtaining device comprises a camera disposed on a first side of the anode composite strip and a light source provided on a second side of the anode composite strip opposite the first side, the light source is a red light source;

a controller, the controller being configured to receive the image obtained by the image obtaining device;

a memory; and a processor, wherein executable instructions are stored in the memory, and the instructions when executed on the processor cause the processor of the displacement detection apparatus to perform:

step S1000: obtaining an image of a portion of an anode composite strip, wherein the anode composite strip comprises an anode plate and a separator attached to a surface of the anode plate, the anode plate comprising positioning holes; and step S2000: calculating a displacement characteristic quantity based on the image, wherein the displacement characteristic quantity indicates a displacement distance and/or angle of the anode composite strip in a specified direction;

wherein the displacement characteristic quantity comprises a strip movement direction displacement, and step S2000 comprises step S2200 of calculating the strip movement direction displacement, step S2200 comprising:

step S2210: positioning, based on the image, a side edge corresponding to the positioning holes parallel to a width direction;

step S2220: calculating a center point of the image and a strip movement direction midline parallel to a strip movement direction;

step S2230: calculating an intersection point between the strip movement direction midline of the image and the side edge corresponding to the positioning holes parallel to the width direction; and step S2240: calculating a distance between the center point and the intersection point as the strip movement direction displacement, wherein the controller device is configured to receive the displacement characteristic quantity and control an operation of the delivery apparatus according to a displacement characteristic quantity output by the displacement detection apparatus.

* * * * *